(12) United States Patent
Nakano et al.

(10) Patent No.: US 6,829,400 B2
(45) Date of Patent: Dec. 7, 2004

(54) OPTICAL PATH SWITCHING APPARATUS

(75) Inventors: Junichi Nakano, Hachioji (JP); Hiroshi Miyajima, Hachioji (JP); Toru Wakabayashi, Machida (JP)

(73) Assignee: Olympus Corporation, Tokyo (JP)

( * ) Notice: Subject to any disclaimer, the term of this patent is extended or adjusted under 35 U.S.C. 154(b) by 324 days.

(21) Appl. No.: 10/100,853

(22) Filed: Mar. 19, 2002

(65) Prior Publication Data

US 2002/0136483 A1 Sep. 26, 2002

(30) Foreign Application Priority Data

Mar. 26, 2001 (JP) .......................................... 2001-087719
Nov. 14, 2001 (JP) .......................................... 2001-349211

(51) Int. Cl.⁷ .............................. G02B 6/26; G02B 6/42
(52) U.S. Cl. ............................................. 385/16; 385/52
(58) Field of Search ........................ 385/52, 22, 16–18

(56) References Cited

U.S. PATENT DOCUMENTS 4,306,252 A * 12/1981 Fearnside ................... 348/205
6,169,826 B1 * 1/2001 Nishiyama et al. ........... 385/22

FOREIGN PATENT DOCUMENTS

| JP | 7-72398 | 3/1995 |
| JP | 8-50253 | 2/1996 |
| JP | 11-23417 | 1/1999 |
| JP | 11-160633 | 6/1999 |
| JP | 11-295623 | 10/1999 |

* cited by examiner

*Primary Examiner*—Diane I. Lee
*Assistant Examiner*—Lisa M. Caputo
(74) *Attorney, Agent, or Firm*—Scully, Scott Murphy & Presser

(57) ABSTRACT

An optical path switching apparatus, which includes an optical element array having a plurality of first optical elements, for optically coupling one of the first optical elements with a second optical element including: a guide extending substantially parallel to an alignment of the first optical elements; a movement mechanism for moving the second optical element, the movement mechanism including a movement portion capable of moving along the guide, the movement portion supporting the second optical element; and position detector for detecting a position of the second optical element.

23 Claims, 11 Drawing Sheets

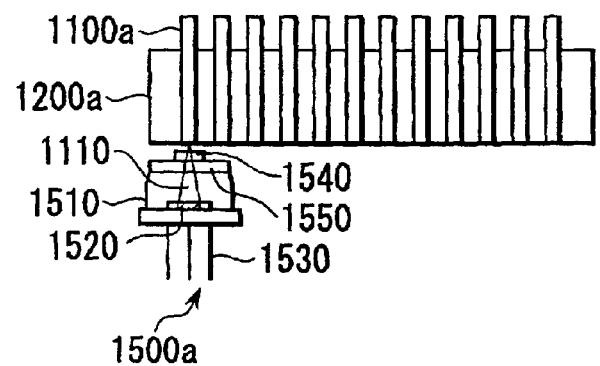
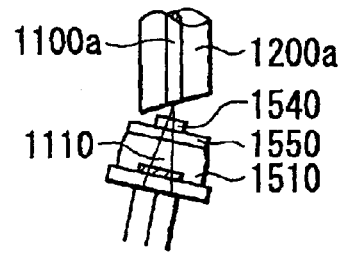
FIG. 23A
FIG. 23B
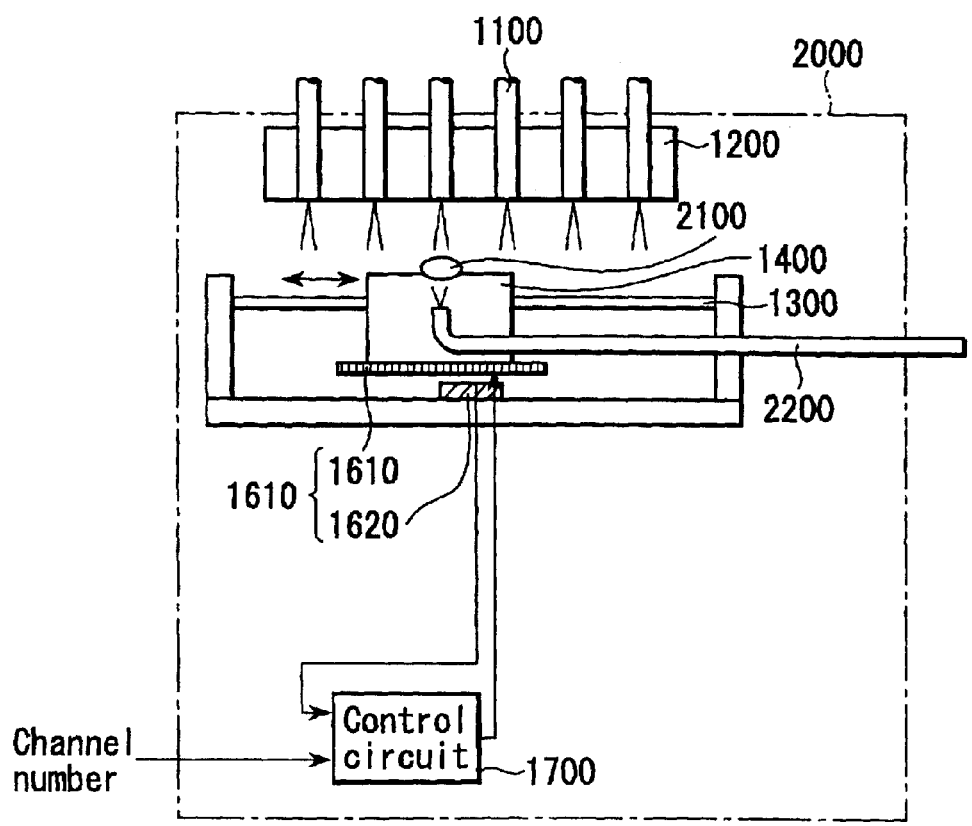
FIG. 24

OPTICAL PATH SWITCHING APPARATUS

CROSS-REFERENCE TO RELATED APPLICATIONS

This application is based upon and claims the benefit of priority from the prior Japanese Patent Applications No. 2001-87719, filed Mar. 26, 2001; and No. 2001-349211, filed Nov. 14, 2001, the entire contents of which are incorporated herein by reference.

BACKGROUND OF THE INVENTION

1. Field of the Invention

The present invention relates to an optical path switching apparatus used in the field of optical communication or optical connection.

2. Description of the Related Art

Switching of a transmission path of optical signals is an important technique in the field of optical communication or optical connection. Such optical path switching is utilized in, e.g., an optical switch, which selects an optical signal from a plurality of transmission paths and switches it to a new path, and an optical monitor, which monitors the statuses of each path. A mechanical optical switch that changes over an optical path by mutually moving opposed optical fiber end faces is simple in structure and has advantages of low insertion loss and small size. Many mechanical optical switches have been proposed.

For example, Jpn. Pat. Appln. KOKAI Publication No. 295623/1999 discloses a pressing mechanism, which moves an optical fiber on a light reception side along an arrangement of a plurality of optical fibers on a transmission side, carries out positioning and then presses the optical fiber end surfaces against each other in order to suppress losses. Movement and pressing are conducted by an ultrasonic linear motor, and the stop position of the optical fiber on the light reception side is controlled by a computer.

Further, Jpn. Pat. Appln. KOKAI Publication No. 72398/1995 or 160633/1999 discloses an apparatus, which fixes a plurality of optical fibers in V-shaped grooves in advance and changes over the optical path by moving the optical fiber opposed to the fixed fibers between the V-shaped grooves by a drive mechanism. In the apparatus, the position accuracy after changeover is improved by fixing the optical fibers in the V-shaped grooves (grooves having the V-shaped cross section).

Furthermore, Jpn. Pat. Appln. KOKAI Publication No. 50253/1996 proposes an optical switch, which includes a plurality of optical fibers arranged on the surface of a circular cylinder, which is rotated by a step motor so that one of the optical fibers is coupled an opposed optical fiber.

In the mechanical optical switch, which distributes signals from a plurality of optical fibers, the optical fibers on the transmission and reception sides must be optically coupled with each other with the low coupling loss. That is, there is required a mechanism that brings the optical axes of the optical fibers on the transmission and reception sides into line after the changeover operation. In order to match the optical axes with each other with the high accuracy, a fixing jig having a V-shaped groove structure or a positioning marker is generally used as described above.

The combination of these members with the drive mechanism that carries out mechanical movement complicates the structure of the apparatus. Moreover, the complicated structure easily comes under the influence of fluctuations in environment, and its characteristic is hard to be kept constant for a long period of time. In order to improve the problem, for example, a mechanism that presses the optical fiber end surfaces against each other is added, but this further complicates the structure of the apparatus.

In addition, in the optical switch having the structure using the V-shaped grooves, since the optical fiber is once lifted from the groove and moved at the time of changeover, high-speed switching is difficult. The operation for pressing the end faces against each other after movement is not suitable for high-speed switching either.

BRIEF SUMMARY OF THE INVENTION

An object of the present invention is to provide an optical path switching apparatus that can perform high-speed switching and whose characteristic is stable with respect to fluctuations in environment.

According to an aspect of the present invention, there is provided an optical path switching apparatus, which includes an optical element array having a plurality of the first optical elements, for optically coupling one of the first optical elements with a second optical element, the optical path switching apparatus comprising: a guide extending substantially parallel to an alignment of the first optical elements; a movement mechanism for moving the second optical element, the movement mechanism including a movement portion capable of moving along the guide, the movement portion supporting the second optical element; and position detecting means for detecting a position of the second optical element. The optical path switching apparatus preferably further comprises a control portion for controlling the position of the movement portion based on information obtained by the position detecting means.

According to another aspect of the present invention, there is provided an optical path switching apparatus, which includes an optical element array having a plurality of the first optical elements, for optically coupling one of the first optical elements with a second optical element, the optical path switching apparatus comprising: a deflecting mirror for deflecting an optical path between the first optical element and the second optical element; a guide extending substantially parallel to an alignment of the first optical elements; a movement mechanism for moving the deflecting mirror, the movement mechanism including a movement portion capable of moving along the guide, the movement portion supporting the deflecting mirror; and position detecting means for detecting a position of the deflecting mirror. The optical path switching apparatus preferably further comprises a control portion for controlling a position of the movement portion based on information obtained by the position detecting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 23A is a plane view showing a positional relationship between an optical fiber array and a light receiving element according to a twelfth embodiment;

FIG. 23B is a side view showing directions of an optical fiber end portion and the light receiving element according to the twelfth embodiment; and FIG. 24 shows a block structure of an optical switch using an optical path switching apparatus according to a thirteenth embodiment of the present invention.

DETAILED DESCRIPTION OF THE INVENTION

First Embodiment

A first embodiment according to the present invention will now be described with reference to FIGS. 1 and 2. This embodiment is an optical monitor having an optical path switching apparatus.

Figure 1:
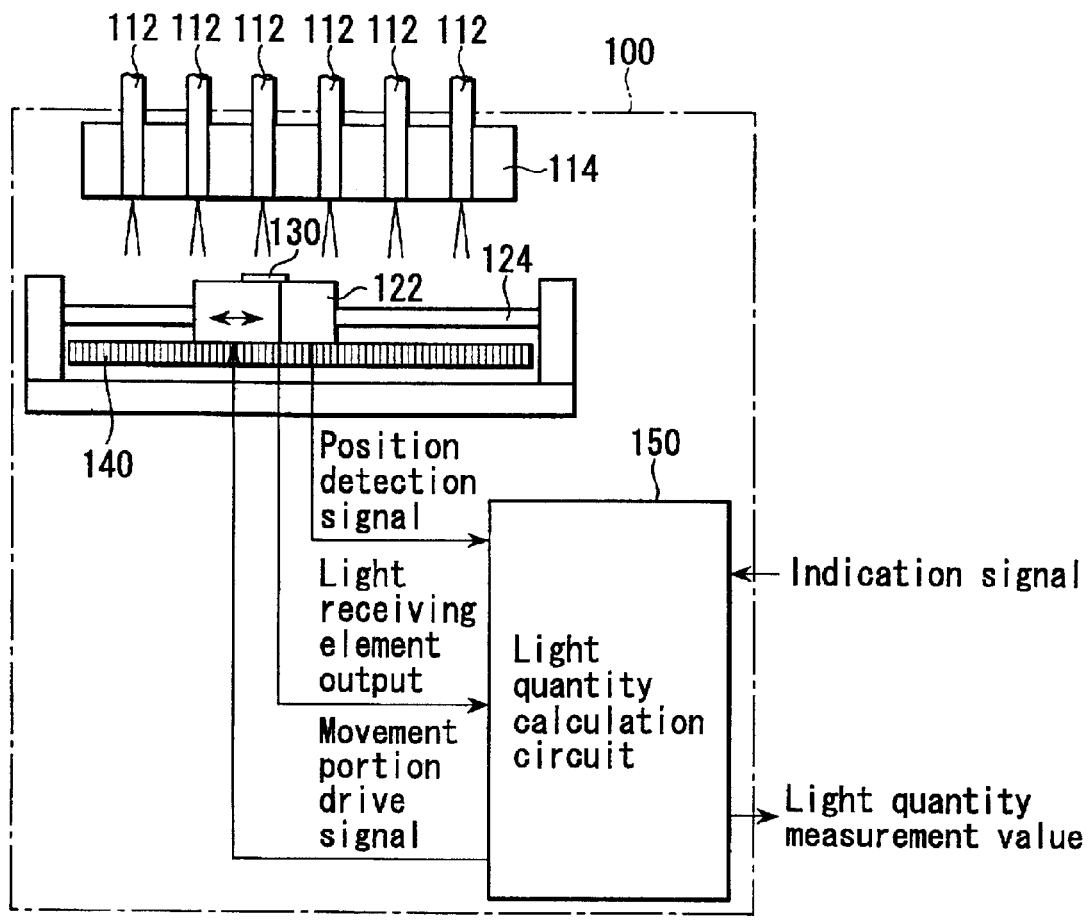
FIG. 1 schematically shows an optical monitor having an optical path switching apparatus as a first embodiment according to the present invention.

As shown in FIG. 1, an optical monitor 100 includes an optical path switching apparatus, which includes an optical element array having a plurality of the first optical elements, for optically coupling one of the first optical elements with a second optical element.

The first optical elements comprise optical fibers 112, which are held in substantially parallel by a fiber holding member 114 so that their end faces are aligned. The optical fibers 112 may have lenses at emission ends thereof. The second optical element comprises a light receiving element 130 used for detecting the light emitted from the optical fiber 112, and outputs an electrical signal corresponding to a quantity of the received light.

The optical path switching apparatus has a movement mechanism, which moves the light receiving element 130 along an alignment of the optical fibers 112. This movement mechanism includes a movement portion 122, which supports the light receiving element 130, and a guide rail 124, which movably supports the movement portion 122.

The movement portion 122 has a drive portion (not shown) therein, and can move along the guide rail 124. The preferred drive portion comprises, for example, a voice coil motor, and the voice coil motor enables high-speed movement and accurate positioning of the movement portion 122.

The guide rail 124 extends in substantially parallel to the alignment of the optical fibers 112. Therefore, the movement portion 122 can move along the alignment of the optical fibers 112.

The light receiving element 130 is attached to the movement portion 122 so as to face the end faces of the optical fibers 112. That is, the light receiving element 130 has a light receiving plane, which is parallel to the end faces of the optical fibers 112. Although, the light receiving element 130 may be arranged on a slant to some degree in order to reduce the reflected light. The light receiving plane of the light receiving element 130 has such a size as that the light emitted from one optical fiber 112 completely falls on the light receiving plane when the light receiving plane of the light receiving element 130 is opposed to this optical fiber 112 but the light emitted from any other optical fiber 112 does not falls on the light receiving plane.

The optical path switching apparatus further comprises an external scale 140 for detecting a position of the light receiving element 130. The external scale 140 can detect a position of the movement portion 122. Since the light receiving element 130 is fixed to the movement portion 122, the external scale 140 can indirectly detect a position of the light receiving element 130.

The optical monitor 100 has a light quantity calculation circuit 150 in addition to the optical path switching apparatus. The light quantity calculation circuit 150 controls a position of the movement portion 122 based on an output from the light receiving element 130, and also calculates a quantity of light illuminating the light receiving element 130, that is, a quantity of light emitted from the optical fiber 112 opposed to the light receiving element 130.

Figure 2:
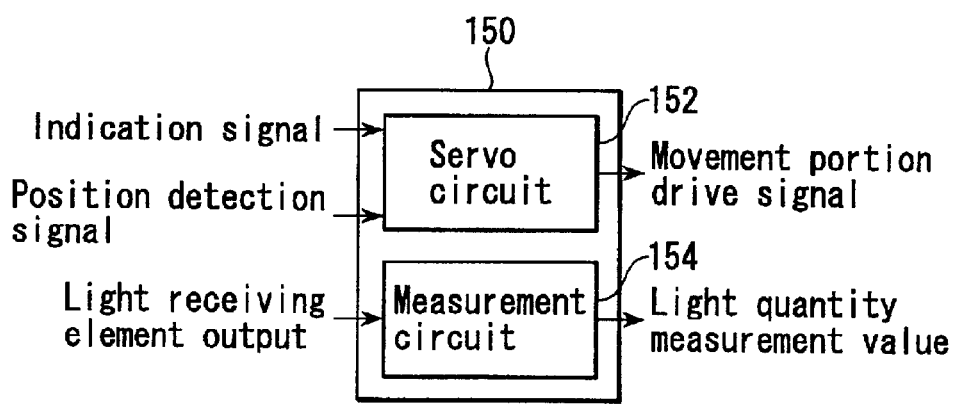
FIG. 2 shows a structure of a light quantity calculation circuit illustrated in FIG. 1.

As shown in FIG. 2, the light quantity calculation circuit 150 has a servo circuit 152 for controlling a position of the movement portion 122, and a measurement circuit 154 for measuring a quantity of light illuminating the light receiving element 130.

The servo circuit 152 controls movement of the movement portion 122 based on an indication signal, which is supplied from the outside of the optical monitor 100, indicating an optical fiber to be monitored, and a position detection signal output from the external scale 140, to oppose the light receiving element 130 to the end face of the optical fiber 112 to be monitored.

The measurement circuit 154 calculates a quantity of light illuminating the light receiving element 130 based on an output from the light receiving element 130, to output the calculated value as a light quantity measurement value of the light emitted from the optical fiber indicated by the indication signal.

The operation of the optical monitor 100 will now be described in detail hereinafter.

The optical fibers 112 are, for example, output ends of the optical switch, and they are measurement targets whose quantity of light emitted therefrom must be rigorously measured. The optical fibers 112, which have coating-removed ends and polished end surfaces, are aligned and held by the fiber holding member 114.

An indication signal, which indicates a measurement target, is input from an external device to the light quantity calculation circuit 150 of the optical monitor 100. For example, an indication signal indicative of a third optical fiber 112 from the left is input from a control computer (not shown) connected to the optical monitor 100.

The external scale 140 detects a position of the movement portion 122 and outputs a position detection signal indicative of the detected position to the light quantity calculation circuit 150. Since the light receiving element 130 is attached to the movement portion 122 at a fixed position, the position detection signal from the external scale 140 corresponds to a current position of the light receiving element 130.

The light receiving element 130 outputs an electrical signal corresponding to a quantity of the light illuminating the light receiving plane thereof. The output from the light receiving element is input to the measurement circuit 154 in the light quantity calculation circuit 150.

In the light quantity calculation circuit 150, the servo circuit 152 calculates a difference between a current position of the light receiving element 130 and a position corresponding to the indication signal based on the indication signal and the position detection signal input thereto, and supplies a movement portion drive signal, which zeroes this difference to a drive portion (not shown) such as a voice coil motor provided in the movement portion 122.

With such feedback control, the light receiving element 130 attached to the movement portion 122 is finally arranged at a position where it is directly opposed the end face of the third optical fiber 112 as a measurement target. As a result, the light receiving plane of the light receiving element 130 is selectively illuminated with only the light emitted from the third optical fiber 112 as a measurement target.

The servo circuit 152 notifies the measurement circuit 154 of end of position control, i.e., the positioning operation. In response to this notification, the measurement circuit 154 obtains the light quantity from the light receiving element output and outputs the light quantity measurement value to an external device (not shown) such as a computer.

As described above, in the optical monitor 100, a quantity of the light emitted from the optical fiber 112 as a measurement target is measured by the optical path switching operation for controlling a position of the movement portion 122 in such a manner that the light receiving element 130 is directly opposed to the optical fiber 112 as a measurement target.

For example, if the optical fibers 112 are output ends of the optical switch, it is possible to carry out detection of failures of the optical switch, measurement of losses in a path that has been switched, measurement of a quantity of cross talk to any other fiber and others by measuring a quantity of the light emitted from each fiber by the optical monitor 100.

Since the light receiving element 130 directly receives the light emitted from the optical fiber 112 without using any other optical component, the optical monitor 100 according to this embodiment can perform the accurate light quantity measurement.

In the optical monitor 100 according to this embodiment, since changeover of the optical path is effected by linear movement of the movement portion 122 supported by the guide rail 124, high-speed optical path switching is possible. Further, the mechanism for switching the optical path has a simple structure, namely, the movement portion 122 supported by the guide rail 124, and hence the characteristic hardly varies due to fluctuations in environment. Furthermore, since the same light receiving element 130 and the measurement circuit 154 are used for measurement with respect to the optical fibers 112, the characteristic of the light receiving element or the amplifier constantly remains unchanged, and measurement with the high repeatability can be conducted. Moreover, since many expensive light receiving elements are not required, the apparatus cost can be suppressed.

Second Embodiment

Figure 3:
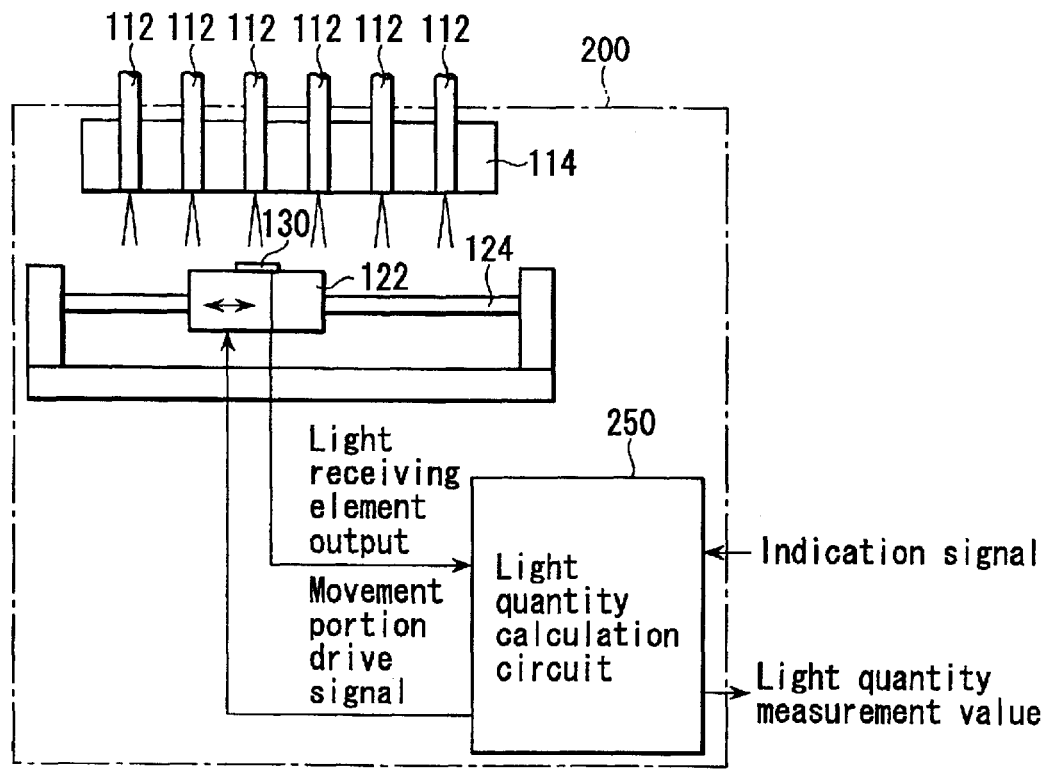
FIG. 3 schematically shows an optical monitor having an optical path switching apparatus as a second embodiment according to the present invention.

A second embodiment according to the present invention will now be described with reference to FIGS. 3 to 5. As similar to the first embodiment, this embodiment is an optical monitor having an optical path switching apparatus. In FIG. 3, members denoted by the same reference numerals as those in the first embodiment are equivalent members.

As shown in FIG. 3, a plurality of optical fibers 112 are held in substantially parallel by a fiber holding member 114 in such a manner that their end faces are arranged in alignment.

An optical monitor 200 has a light receiving element 130, which outputs an electrical signal corresponding to a quantity of light illuminating the light receiving plane thereof, an optical path switching apparatus, which selectively leads the light emitted from a specific optical fiber 112 to the light receiving element 130, and a light quantity calculation circuit 250 for calculating a quantity of the light illuminating the light receiving element 130.

The optical path switching apparatus has a movement mechanism, which moves the light receiving element 130 along an alignment of the optical fibers 112. The movement mechanism has a movement portion 122, which supports the light receiving element 130, and a guide rail 124, which movably supports the movement portion 122.

The movement portion 122 has a drive portion (not shown) therein and can move along the guide rail 124. The guide rail 124 extends in substantially parallel to the alignment of the optical fibers 112. The movement portion 122 can, therefore, move along the alignment of the optical fibers 112.

The light receiving element 130 is attached to the movement portion 122 so as to be opposed to the end faces of the optical fibers 112. That is, the light receiving plane of the light receiving element 130 and the end faces of the optical fibers 112 are arranged so as to be parallel to each other.

The light receiving plane of the light receiving element 130 has such a size as that the light emitted from one optical fiber 112 is all incident upon this light receiving plane when it is directly opposed to this optical fiber 112 but the light emitted from any other optical fiber 112 does not enter the same.

Figure 4:
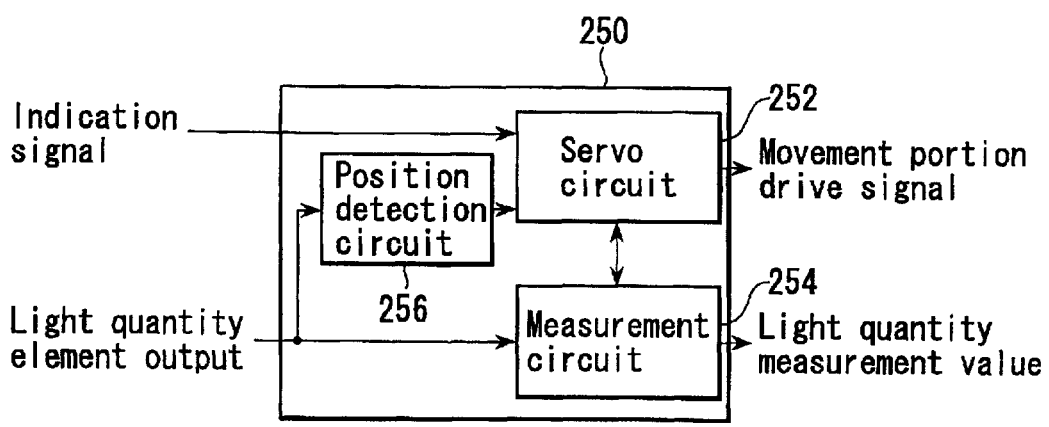
FIG. 4 shows a structure of a light quantity calculation circuit illustrated in FIG. 3.
Figure 5:
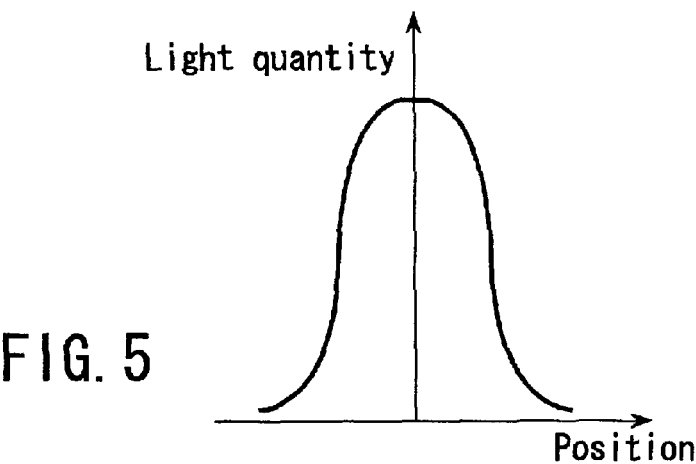
FIG. 5 shows an output from a light receiving element with respect to a position in the vicinity of an optical fiber which is a measurement target.

As shown in FIG. 4, the light quantity calculation circuit 250 has a servo circuit 252 for controlling a position of the movement portion 122, a measurement circuit 254 for measuring a quantity of the light illuminating the light receiving element 130, and a position detection circuit 256 for detecting a position of the light receiving element 130.

The position detection circuit 256 detects a position at which an output from the light receiving element 130 becomes maximum and outputs a position signal indicative of this position to the servo circuit 252.

The servo circuit 252 controls movement of the movement portion 122 based on an indication signal, which is supplied from the outside of the optical monitor 200 and indicates an optical fiber as a measurement target, and the position signal of the light receiving element 130 from the position detection circuit 256 in such a manner that the light receiving element 130 is opposed to the optical fiber 112 that is a measurement target.

The measurement circuit 254 calculates a quantity of the light illuminating the light receiving element 130 based on an output from the light receiving element 130, and outputs its value as a light quantity measurement value.

The operation of the optical monitor 200 will now be described in detail hereunder.

An indication signal indicative of the optical fiber 112 as a measurement target is input from an external device to the light quantity calculation circuit 250 of the optical monitor 200.

The servo circuit 252 moves the movement portion 122 to the vicinity of the optical fiber 112 as a measurement target in accordance with the input indication signal. As shown in FIG. 3, the light rays emitted from the respective optical fibers 112 do not overlap each other at a position of the light receiving element 130. In the vicinity of the optical fiber 112 as a measurement target, therefore, an output from the light receiving element 130 varies in accordance with a position of the light receiving element 130 as shown in FIG. 5.

The position detection circuit 256 cooperates with the servo circuit 252 and obtains a position at which the output from the light receiving element 130 becomes maximum. The position at which the output from the light receiving element 130 becomes maximum is a position where the light receiving plane of the light receiving element 130 is naturally directly opposed to the end face of the optical fiber 112 as a measurement target.

Specifically, the position at which the output from the light receiving element 130 becomes maximum can be obtained by the position detection circuit 256, which checks the output from the light receiving element 130 while reciprocating the movement portion 122 in the vicinity of the optical fiber 112 as a measurement target by the servo circuit 252.

The position signal indicative of the thus obtained position at which the output from the light receiving element 130 becomes maximum is input to the servo circuit 252. The servo circuit 252 supplies a movement portion drive signal corresponding to this position signal to a drive portion (not shown) such as a voice coil motor provided in the movement portion 122. As a result, the light receiving element 130 is arranged at a position at which it is directly opposed to the end face of the optical fiber 112 as a measurement target, and the light receiving plane of the light receiving element 130 is illuminated with only the light emitted from the optical fiber 112 as a measurement target.

The servo circuit 252 notifies the measurement circuit 254 of end of the positioning operation. In response to this notification, the measurement circuit 254 obtains the light quantity at this moment from the light receiving element output, and outputs its light quantity measurement value to an external device (not shown) such as a computer. The light quantity measurement value output from the measurement circuit 254 indicates a quantity of the light illuminating the light receiving element 130. In other words, this value indicates a quantity of the light emitted from the optical fiber 112 as a measurement target.

In this manner, a quantity of the light emitted from the optical fiber 112 as a measurement target is measured.

This embodiment has the similar advantages as those in the first embodiment. Additionally, in this embodiment, since the optical fiber 112 and the light receiving element 130 are positioned based on the output from the light receiving element 130, this embodiment is not provided with the external scale, which is different from the first embodiment. The apparatus cost can be thereby reduced. Further, even if the optical fiber 112 deviates from the original alignment position and is held at this position, the position of the optical fiber 112 is controlled based on an output from the light receiving element 130, and the optical fiber 112 and the light receiving element 130 are hence correctly positioned.

Third Embodiment

A third embodiment according to the present invention will now be described with reference to FIGS. 6 and 7. This embodiment is modifications of the light receiving element and the position detection circuit.

Figure 6:
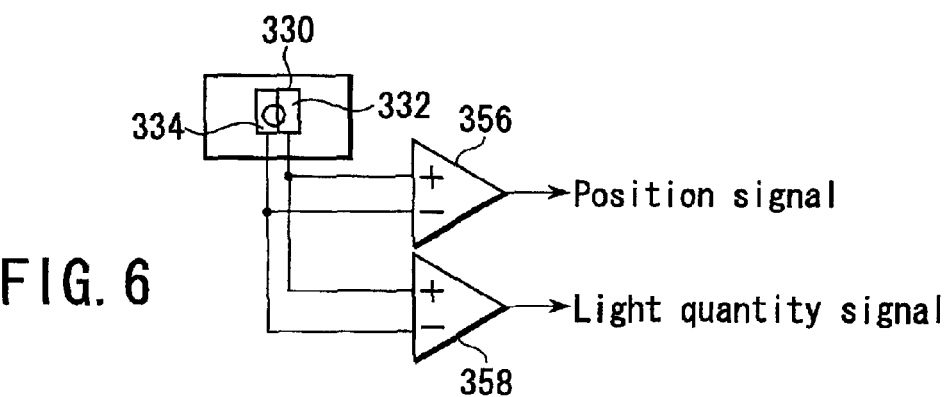
FIG. 6 schematically shows a light receiving element as a third embodiment according to the present invention and its peripheral circuits.
Figure 7:
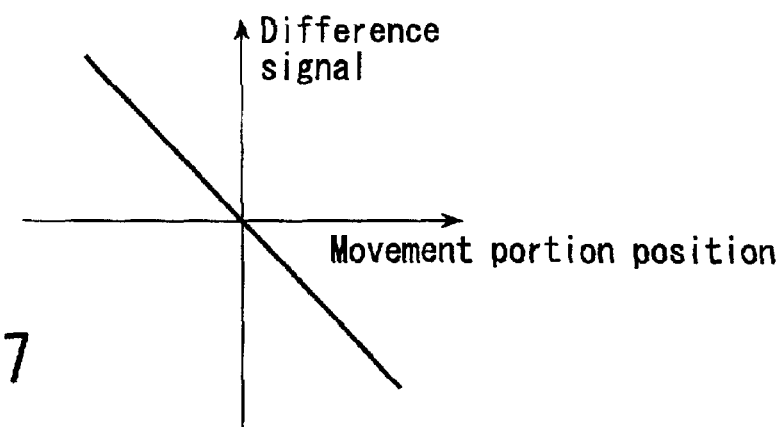
FIG. 7 shows an output from a differential amplifier illustrated in FIG. 6 with respect to a position of a movement position.

As shown in FIG. 6, the light receiving element 330 has two light receiving areas 332 and 334. The two light receiving areas 332 and 334 are aligned so as to be adjacent to each other. A peripheral circuit of the light receiving element 330 has a differential amplifier 356, which outputs a signal corresponding to a difference between outputs of the two light receiving areas 332 and 334, and an addition amplifier 358, which outputs a signal corresponding to a sum of outputs of the two light receiving areas 332 and 334.

A sum signal output from the addition amplifier 358 reflects a total quantity of the light illuminating the two light receiving areas 332 and 334. It can be said that this signal is a light quantity signal indicative of a quantity of the light illuminating the light receiving element 330. This light quantity signal corresponds to the light receiving element output in the second embodiment.

A difference signal output from the differential amplifier 356 reflects a position of a light spot formed on the light receiving plane of the light receiving element 330. It can be said that this signal is a position signal indicative of a position of the light receiving element 330 relative to the optical fiber 112. The differential amplifier 356 corresponds to the position detection circuit in the second embodiment.

When a spot of the light emitted from the fiber 112 is placed at the center of the light receiving element 330, i.e., when the center of the spot is positioned directly above the boundary between the two light receiving areas 332 and 334, outputs from the two light receiving areas 332 and 334 are equal, and the difference signal output from the differential amplifier 356, namely, the position signal, therefore, indicates zero.

On the other hand, as shown in FIG. 6 for example, when the movement portion deviates from the spot of the emitted light toward the right side, namely, when the spot of the emitted light deviates from the light receiving element 330 toward the left side, the output from the light receiving area 334 on the left side is larger than the output from the light receiving area 332 on the right side, and the position signal output from the differential amplifier 356, thus, indicates negative. Further, the quantity of the position signal depends on an amount of shifting of the spot from the center of the light receiving element 330.

On the contrary, when the spot of the emitted light deviates from the light receiving element 330 toward the right side, the position signal output from the differential amplifier 356 indicates positive. Therefore, the difference signal (position signal) relative to a position of the movement portion is as shown in FIG. 7. Based on FIG. 7, an amount and a direction of displacement of the light receiving element 330 relative to the optical fiber 112 as a measurement target can be perceived from the quantity and the positive/negative state of the position signal output from the differential amplifier 356.

This embodiment also has the same advantages as those in the first embodiment. Furthermore, in this embodiment, since an amount and a direction of displacement of the light receiving element 330 relative to the optical fiber 112 as a measurement target can be perceived from the quantity and the positive/negative state of the position signal output from the differential amplifier 356, the position control over the movement portion 122 can be readily executed at a high speed as compared with the second embodiment.

Although the light receiving element 330 has the two light receiving areas in this embodiment, a number of these areas is not restricted two and it may be appropriately changed. For example, three or four light receiving areas may be adopted. In this case, a position of the light receiving element with respect to a measurement target can be detected based on the difference signal of outputs from two or more arbitrary light receiving areas.

Moreover, although it is most preferable that the boundary of these light receiving areas extends so as to be orthogonal to an alignment of the optical fibers in order to detect a position of the light receiving element, a position of the light receiving element can be detected as long as the boundary extends so as to cut across the alignment of the optical fibers.

Fourth Embodiment

Figure 8:
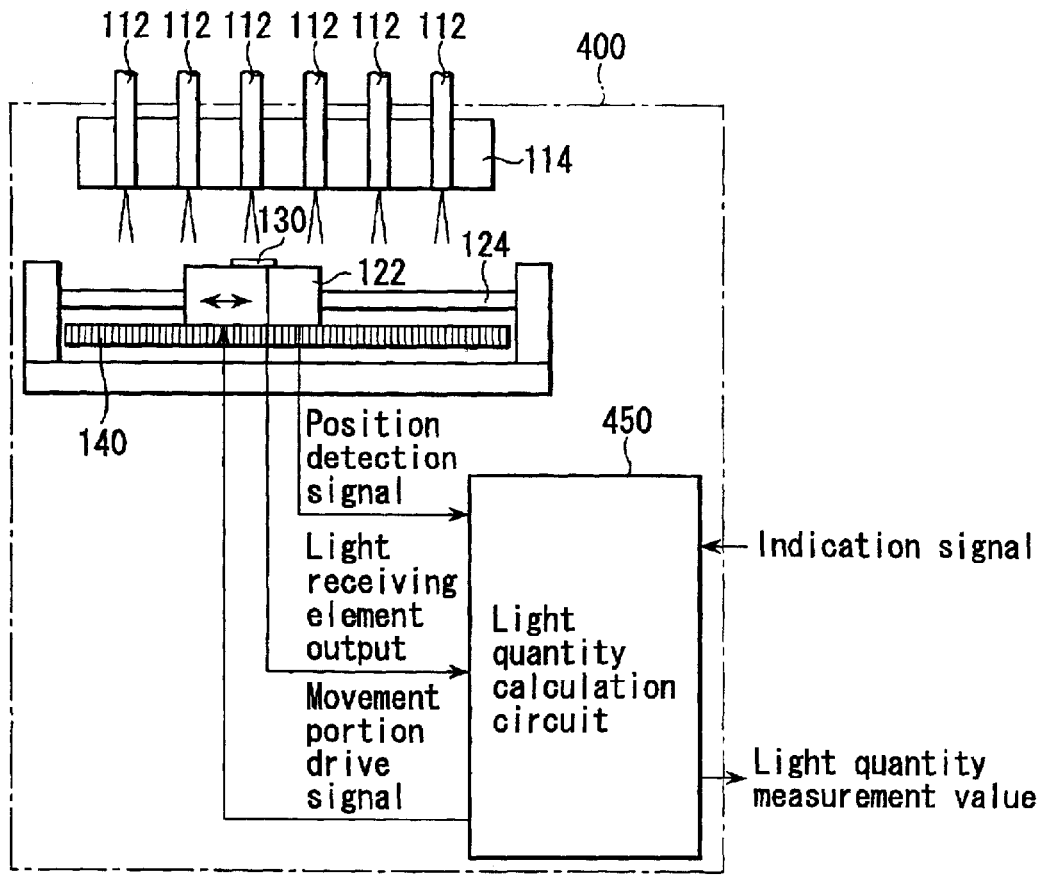
FIG. 8 schematically shows an optical monitor having an optical path switching apparatus as a fourth embodiment according to the present invention.

A fourth embodiment according to the present invention will now be described with reference to FIGS. 8 and 9. This embodiment is an optical monitor having an optical path switching apparatus as similar to the first embodiment. In FIG. 8, members designated by reference numerals equal to those in the first embodiment are like or corresponding members.

As shown in FIG. 8, a plurality of optical fibers 112 are arranged and held in parallel by a fiber holding member 114 in such a manner that their end faces are positioned in alignment.

An optical monitor 400 has: a light receiving element 130, which outputs an electrical signal corresponding to a quantity of the light illuminating a light receiving plane thereof; an optical path switching apparatus, which selectively leads the light emitted from a specific optical fiber 112 to the light receiving element 130; and a light quantity calculation circuit 450, which calculates a quantity of the light illuminating the light receiving element 130.

The optical path switching apparatus has a movement mechanism for moving the light receiving element 130 along an alignment of the optical fibers 112, and an external scale 140 for detecting a position of the light receiving element 130. The movement mechanism has a movement portion 122, which supports the light receiving element 130 and a guide rail 124, which movably supports the movement portion 122.

The movement portion 122 has a drive portion (not shown) therein and can move along the guide rail 124. The guide rail 124 extends in substantially parallel with the alignment of the optical fibers 112. The movement portion 122 can, therefore, move along the alignment of the optical fibers 112.

The light receiving element 130 is attached to the movement portion 122 in such a manner that the light receiving plane thereof is opposed to the end faces of the optical fibers 112. That is, the light receiving plane of the light receiving element 130 and the end faces of the optical fibers 112 are arranged in parallel with each other.

The light receiving plane of the light receiving element 130 has such a size as that the light emitted from one optical fiber 112 is all incident upon the light receiving plane when the light receiving plane is directly opposed to that optical fiber 112 but the light emitted from any other optical fiber 112 does not enter this plane.

Figure 9:
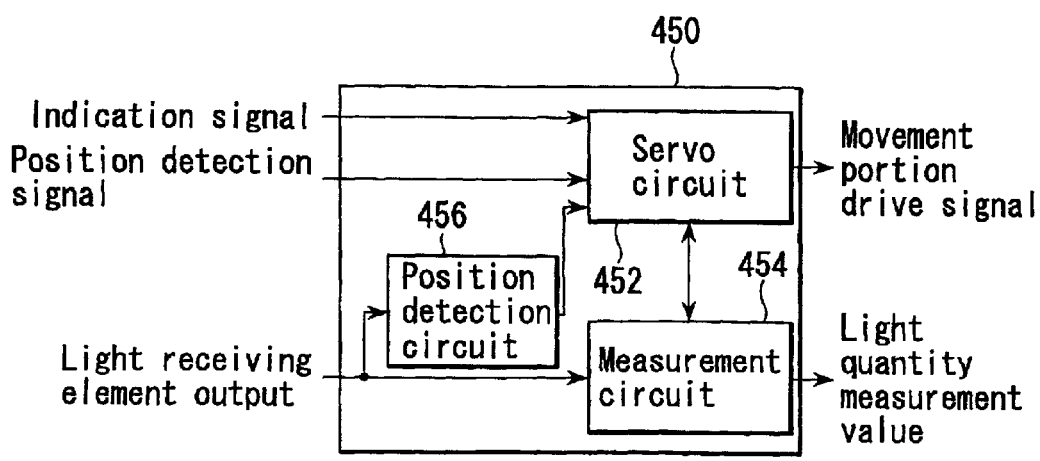
FIG. 9 shows a structure of a light quantity calculation circuit depicted in FIG. 8.

As shown in FIG. 9, the light quantity calculation circuit 450 has: a servo circuit 452, which controls a position of the movement portion 122; a measurement circuit 454, which measures a quantity of the light illuminating the light receiving element 130; and a position detection circuit 456, which detects a position of the light receiving element 130 with respect to the optical fiber 112 as a measurement target.

The operation of the optical monitor 400 will now be described hereunder.

An indication signal, which indicates the optical fiber 112 as a measurement target, is input from an external device to the light quantity calculation circuit 450 of the optical monitor 400.

The servo circuit 452 calculates a difference between a position corresponding to the indication signal and a current position of the light receiving element 130 based on the indication signal input from the outside and a position detection signal input from the external scale 140, and supplies a movement portion drive signal, which zeroes this difference to the drive portion in the movement portion 122, thereby performing rough positioning of the light receiving element 130.

After the rough positioning, the light quantity calculation circuit 450 checks an output from the light receiving element 130 in, for example, the position detection circuit 456. When the light receiving element output is not less than a predetermined value, the position detection circuit 456 outputs a position signal to the servo circuit 452, and the servo circuit 452 performs precise positioning of the light receiving element 130 based on this position signal in accordance with the technique described in connection with the second embodiment.

The servo circuit 452 notifies the measurement circuit 454 of end of precise positioning. In response to this notification, the measurement circuit 454 obtains a quantity of the light illuminating the light receiving element 130 from the light receiving element output and outputs a light quantity measurement value.

When the light receiving element output is less than the predetermined value, the position detection circuit 456 outputs a signal indicative of this fact to the servo circuit 452. In response to this signal, the servo circuit 452 does not perform precise positioning but notifies the measurement circuit 454 of end of positioning. With respect to this notification, the measurement circuit 454 obtains a quantity of the light illuminating the light receiving element 130 from the light receiving element at this moment and outputs the light quantity measurement value.

This embodiment also has the same advantages as those in the first embodiment. Moreover, in this embodiment, when the light receiving element output from the light receiving element 130 is not less than the predetermined value after performing rough positioning of the light receiving element 130 based on the position detection signal from the external scale 140, precise positioning of the light receiving element 130 is carried out based on the light receiving element output. Therefore, even if the optical fiber 112 is held so as to be displaced from the original alignment position, the light receiving element 130 is correctly positioned to the optical fiber 112 as a measurement target.

In addition, when the light receiving element output from the light receiving element 130 is less than the predetermined value, since the positioning operation is terminated with rough positioning based on the position detection signal from the external scale 140. Thus, even if the light is not emitted from the optical fiber 112 as a measurement target, or when the light is extremely weak even though it is emitted, the light receiving element 130 can be correctly positioned without losing sight of the optical fiber 112 as a measurement target.

Fifth Embodiment

A fifth embodiment according to the present invention will now be described with reference to FIGS. 10 and 11. This embodiment is an improvement that can be applied to any of the above-described embodiments.

Figure 10:
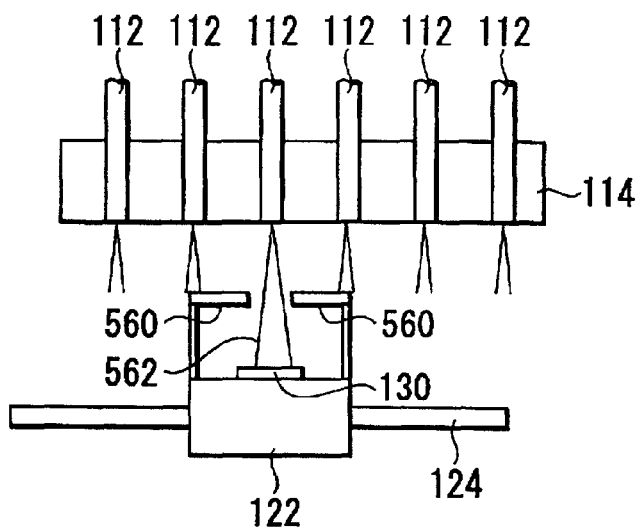
FIG. 10 shows an example of an improved movement portion as a fifth embodiment.
Figure 11:
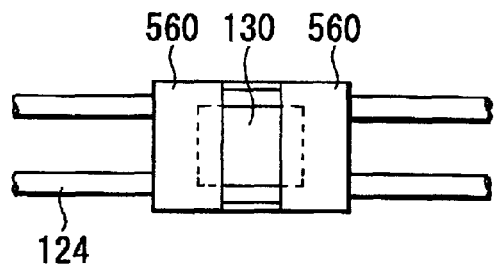
FIG. 11 is a plane view of the movement portion depicted in FIG. 10.

As shown in FIGS. 10 and 11, the optical path switching apparatus according to this embodiment has a pair of light shielding members 560 attached to the movement portion 122. A pair of the light shielding members 560 are positioned between the optical fiber 112 and the light receiving element 130, and define an opening 562, which restricts incident light to the light receiving element 130.

The width of the opening 562 (dimension parallel to an alignment of the optical fibers 112) has a value smaller than an alignment interval of the optical fibers 112. Therefore, when the light receiving element 130 is opposed to the optical fiber 112 as a measurement target, the light from any adjacent optical fiber 112 is prevented by the shielding member 560, and hence this light can not enter the light receiving element 130.

Accordingly, undesired incident of the light upon the light receiving element 130 can be avoided, and only the light emitted from the optical fiber 112 as a measurement target can be accurately measured.

Additionally, since the light emitted from an optical fiber 112 that is not a measurement target is prevented by the light shielding member 560, the light receiving element 130 may be arranged away from the optical fibers 112. This reduces the light that is reflected by the light receiving element 130 or its periphery and again enters the optical fiber 112.

Further, the opening 562 has a small dimension in the alignment direction of the optical fibers 112 and a large dimension in the direction orthogonal to the former direction. Therefore, such dimensions contribute to reduction in the position accuracy required for the alignment of the optical fibers 112 and in the manufacturing cost of the apparatus.

Sixth Embodiment

Figure 12:
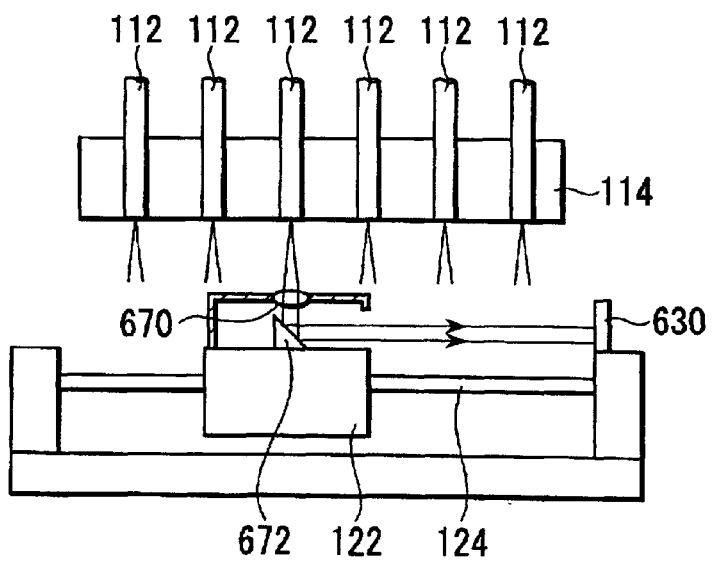
FIG. 12 schematically shows an optical monitor having an optical path switching apparatus as a sixth embodiment according to the present invention.

A sixth embodiment according to the present invention will now be described with reference to FIG. 12. This embodiment is an optical monitor having an optical path switching apparatus as similar to the first embodiment. In FIG. 12, members denoted by the same reference numerals as those in the first embodiment are like or corresponding members.

As shown in FIG. 12, a plurality of optical fibers 112 are held and arranged by a fiber holding member 114 in substantially parallel in such a manner that their end faces are positioned in alignment.

The optical monitor has: a light receiving element 630, which outputs an electrical signal corresponding to a quantity of the light illuminating a light receiving plane thereof; and an optical path switching apparatus, which selectively leads the light emitted from a specific optical fiber 112 to the light receiving element 130.

The optical path switching apparatus has: a convex lens 670 for converting divergent light emitted from the optical fiber 112 into parallel light; a deflecting mirror 672, which deflects the parallel light toward the light receiving element 630; and a movement mechanism, which moves the convex lens 670 and the deflecting mirror 672 along an alignment of the optical fibers 112.

The movement mechanism has a movement portion 122, which supports the convex lens 670 and the deflecting mirror 672, and a guide rail 124, which movably supports the movement portion 122. The convex lens 670 and the deflecting mirror 672 are aligned in parallel with the direction along which the optical fibers 112 extend, and fixed to the movement portion 122.

The movement portion 122 has a drive portion (not shown) therein, and can move along the guide rail 124. The guide rail 124 extends in substantially parallel with the alignment of the optical fibers 112. Therefore, the movement portion 122 can move along the alignment of the optical fibers 112.

The light receiving element 630 is fixed to an immovable member, for example, a member that supports the guide rail 124 of the movement mechanism.

The movement portion 122 is subjected to position control in such a manner that the convex lens 670 and the deflecting mirror 672 are opposed to the optical fiber as a measurement target. When the convex lend 670 and the deflecting mirror 670 are directly opposed to the optical fiber 112 as a measurement target, the divergent light emitted from the optical fiber 112 is converted into the parallel light by the convex lens 670, reflected in parallel to the guide rail 124 by the deflecting mirror 672, and radiated to the light receiving element 630. Then, a quantity of this light is measured.

Since the light emitted from the optical fiber 112 as a measurement target is the parallel light until it reaches the light receiving element 630 from the convex lens 670 through the deflecting mirror 672, the coupling state between the optical fiber 112 and the light receiving element 630 can be maintained constant irrespective of movement of the movement portion 122.

This embodiment also has the same advantages as those in the first embodiment. In this embodiment, since the light receiving element 630 is fixed to the immovable member, handling of wirings from the light receiving element 630 is facilitated. However, since optical components such as the convex lens 670 or the deflecting mirror 672 enter the optical path reaching the light receiving element 630 from the optical fiber 112 as a measurement target, the measurement accuracy is sacrificed to some degree.

Seventh Embodiment

A seventh embodiment according to the present invention will now be described with reference to FIGS. 13 and 14. This embodiment is a modification of the light quantity calculation circuit according to the second embodiment.

Figure 13:
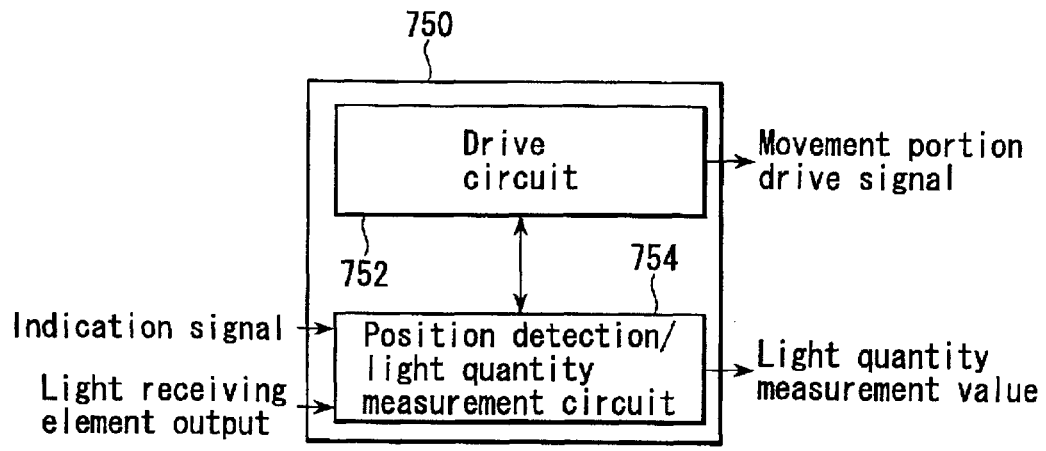
FIG. 13 shows a structure of a light quantity calculation circuit with respect to a movement portion which moves at a given fixed speed as a seventh embodiment according to the present invention.

As shown in FIG. 13, the light quantity calculation circuit 750 has a drive circuit 752, which drives the movement portion, and a position detection/light quantity measurement circuit 754.

The drive circuit 752 supplies to the drive portion in the movement portion a movement drive signal used for moving the movement portion at a fixed speed. As a result, the movement portion moves along the guide rail, namely, the alignment of the optical fibers at a fixed speed.

Figure 14:
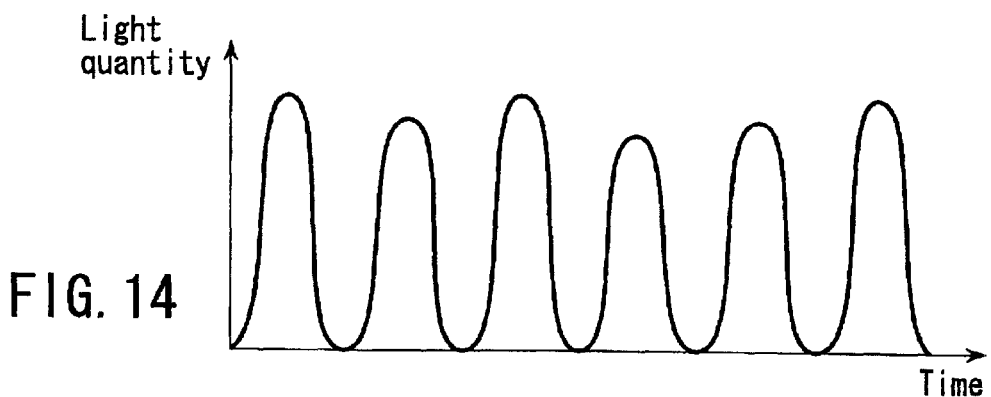
FIG. 14 shows a waveform of an output from a light receiving element relative to movement of the movement portion at a fixed speed.

As shown in FIG. 14, in regard to a waveform of the light receiving element output with respect to movement of the movement portion at a fixed speed, a peak appears relative to a time axis with a constant cycle. In such a waveform, a position of the peak on the time axis corresponds to a position of the optical fiber, and a quantity of the peak corresponds to a quantity of the light emitted from the optical fiber placed at a position corresponding to that peak.

The position detection/light quantity measurement circuit 754 acquires the waveform of the light receiving element output obtained by moving the movement portion at a fixed speed in this manner, obtains a peak corresponding to the optical fiber as a measurement target indicated by the indication signal input from the outside, and outputs a value of the quantity of that peak as a light quantity measurement value.

This embodiment likewise has the same advantages as those in the first embodiment. Further, in this embodiment, the light quantity calculation circuit 750 does not have a servo system, which is complicated in design, and the manufacturing cost of the apparatus can be thereby suppressed.

In this embodiment, although detection of a position and measurement of the light quantity are carried out by using hardware of the position detection/light quantity measurement circuit 754, they may be performed by software processing.

Eighth Embodiment

Figure 15:
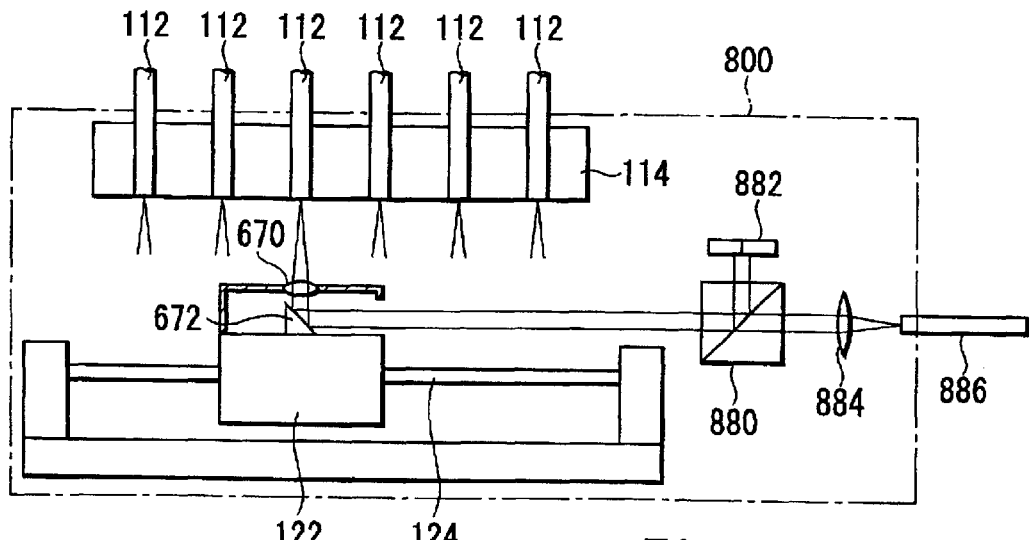
FIG. 15 schematically shows an optical switch having an optical path switching apparatus as an eighth embodiment according to the present invention.

An eighth embodiment according to the present invention will now be described with reference to FIG. 15. This embodiment is an optical switch having an optical path switching apparatus. In FIG. 15, members denoted by the same reference numerals as those in the sixth embodiment are like or corresponding members.

In FIG. 15, an optical switch 800 includes an optical path switching apparatus, which includes an optical element array having a plurality of first optical elements, for optically coupling one of the first optical elements to a second optical element.

The first optical elements comprise optical fibers 112, which are held in substantially parallel by a fiber holding member 114 so that their end faces are aligned. The second optical element comprises an optical fiber 886, which is optically coupled with a non-illustrated other optical member. Assuming that a number of the optical fibers 112 is N, the optical switch 800 is an N-to-1 optical switch.

The optical path switching apparatus has: a convex lens 670, which converts the divergent light emitted from the optical fiber 112 into the parallel light; a deflecting mirror 672, which deflects the parallel light toward the light receiving element 630; and a movement mechanism, which moves the convex lens 670 and the deflecting mirror 672 along an alignment of the optical fibers 112.

The movement mechanism has: a movement portion 122, which supports the convex lens 670 and the deflecting mirror 672; and a guide rail 124, which movably supports the movement portion 122. The convex lens 670 and the deflecting mirror 672 are aligned in parallel with the direction along which the optical fibers 112 extend and fixed to the movement portion 122.

The movement portion 122 has a drive portion (not shown) therein, and can move along the guide rail 124. The guide rail 124 extends in substantially parallel to the alignment of the optical fibers 112. Therefore, the movement portion 122 can move along the alignment of the optical fibers 112.

The optical switch has a convex lens 884, which converts the parallel light from the deflecting mirror 672 into convergent light. The convex lens 884 efficiently leads the light from the deflecting mirror 672 to the optical fiber 886 by converting the parallel light from the deflecting mirror 672 into the convergent light.

The optical switch further has: a beam splitter 880, which takes out a part of the parallel light from the deflecting mirror 672; and a light receiving element 882 for detecting the light taken out by the beam splitter 880.

The beam splitter 880 is arranged between the deflecting mirror 672 and the convex lens 884 and partially reflects the parallel light from the deflecting mirror 672 toward the light receiving element 882. The light receiving element 882 outputs an electrical signal corresponding to a quantity of the light illuminating the light receiving element 882.

The movement portion 122 is subjected to position control in such a manner that the convex lens 670 and the deflecting mirror 672 are opposed to the optical fiber 112 as a selection target. When the convex lens 670 and the deflecting mirror 672 are directly opposed to the optical fiber 112 as a selection target, the divergent light emitted from the optical fiber 112 is converted into the parallel light by the convex lens 670, reflected in parallel with the guide rail 124 by the deflecting mirror 672, and reaches the beam splitter 880.

The parallel light that has passed through the beam splitter 880 is converted into the convergent light by the convex lens 884 and efficiently led to the optical fiber 886. Furthermore, the light reflected by the beam splitter 880 is radiated to the light receiving element 882. An output from the light receiving element 882 is utilized to verify whether the optical path has been correctly switched, for example.

An output from the light receiving element 882 may be used for position detection or position control of the deflecting mirror 672. The same technique as that of the optical path switching apparatus described in the second embodiment can be applied to this operation. The light receiving element 882 may have two light receiving areas. The same technique as that of the optical path switching apparatus described in the third embodiment can be applied to such a light receiving element 882.

In this way, in the optical switching 800, the optical switch operation is executed by the optical path switching operation that controls a position of the movement portion 122 in such a manner that the convex lens 670 and the deflecting mirror 672 are correctly opposed to the optical fiber 112 as a selection target.

In the optical switch 800 in this embodiment, since the optical path is switched by linear movement of the movement portion 122 supported by the guide rail 124, the high-speed optical path switching is possible. Furthermore, since the mechanism for switching the optical path adopts the simple structure, namely, the movement portion 122 supported by the guide rail 124, changes in characteristic due to fluctuations in environment are suppressed.

In the above description, although a propagation direction of the light directs toward the optical fiber 886 from the optical fiber 112, the reverse direction can be also used. Furthermore, the light may be bi-directionally propagated from the optical fiber 112 to the optical fiber 886 and from the optical fiber 886 to the optical fiber 112.

In regard to position detection or position control of the movement portion 122, the same technique as that of the optical path switching apparatus described in connection with the first or fourth embodiment may be applied to the optical switch according to this embodiment. That is, the optical switch may have an external scale used for detecting a position of the movement portion 122.

The end portion of the optical fiber 886 may be attached to the movement portion 122 in such a manner that its end face is opposed to the end face of the optical fiber 112. Moreover, the beam splitter 880 and the light receiving element 882 may be arranged at a rear stage of the optical fiber 886.

Ninth Embodiment

Figure 16:
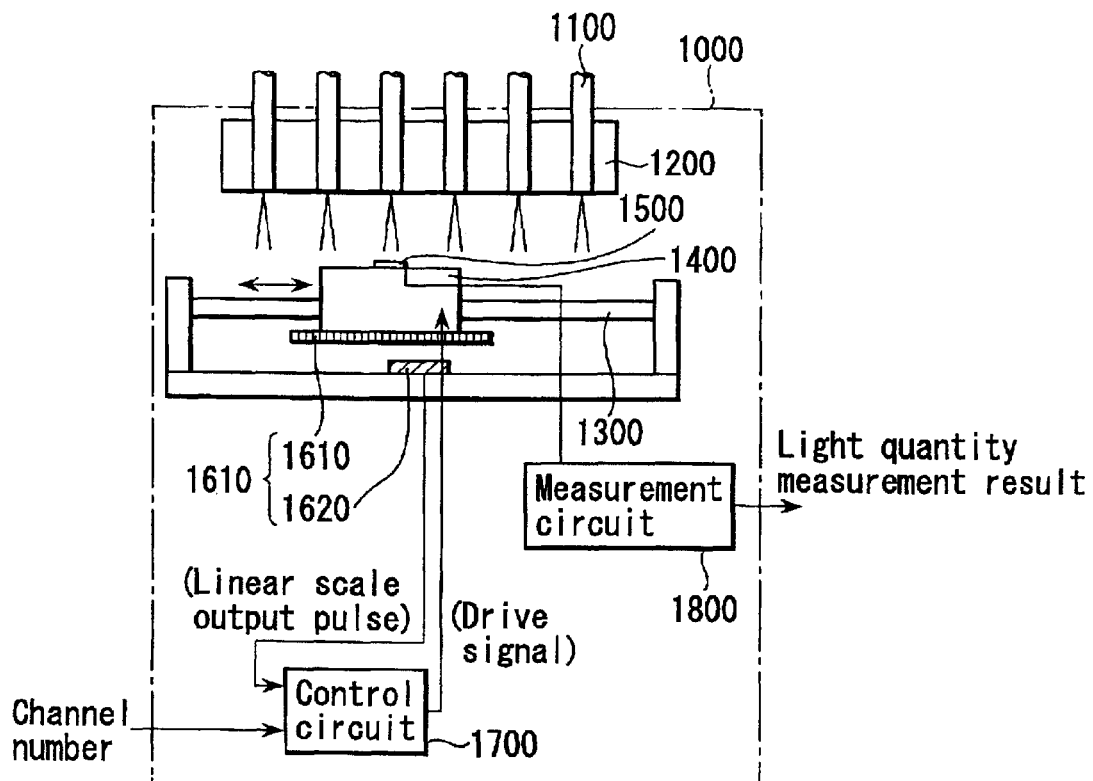
FIG. 16 schematically shows a structure of an optical path switching apparatus as a ninth embodiment according to the present invention.

A ninth embodiment according to the present invention will now be described with reference to FIGS. 16 and 17. FIG. 16 shows a structure of an optical monitor including an optical path switching apparatus as the ninth embodiment, and description will be given as to the structure and the operation as the optical monitor 1000.

The optical monitor 1000 is an apparatus capable of measuring a quantity of the light emitted from a plurality of first optical elements, i.e., optical fibers 1100 by a single second optical element, namely, a light receiving element 1500, and includes a part of the optical path switching function in the structure thereof.

The optical path switching apparatus has: a movement mechanism, which moves the light receiving element 1500 along an alignment of the optical fibers 1100; a linear scale for detecting a position of the light receiving element 1500; and controlling means for controlling positioning of the movement mechanism based on an output from the linear scale.

The controlling means includes scale target value outputting means for outputting a predetermined scale target value as a positioning target value of the movement mechanism and position error calculating means for obtaining an error between the scale target value and a linear scale output, and an output from the position error calculating means is fed back as a drive signal for the movement mechanism.

As shown in FIG. 16, the optical fibers 1100 as the first optical elements are connected to, e.g., an output end of the optical switch or a wavelength filter, and are a measurement target whose quantity of the light emitted therefrom must be rigorously measured. Coating on an end of each of these optical fibers 1100 is removed, and its end face is polished. These optical fibers 1100 are held by a fiber holding portion 1200 in the aligned state.

In addition, the movement mechanism has a guide rail 1300 in a direction along which the optical fibers 1100 are aligned, and a movement portion 1400, which is movable along the guide rail 1300. The light receiving element 1500 as the second optical element is provided to the movement portion 1400, and the light receiving element 1500 outputs an electrical signal corresponding to a quantity of the light illuminating a light receiving plane thereof.

A scale portion 1610 of the linear scale 1600 is integrally provided to the movement portion 1400, and an optical head portion 1620 of the linear scale 1600 is provided to the fixed side part of the movement portion 1400 opposed to the scale portion 1610, thereby enabling detection of movement of the movement portion 1400 by the linear scale 1600.

An output from the linear scale 1600 is connected to a control circuit 1700 as controlling means, and an output from the control circuit 1700 is fed back to the movement portion 1400 as a drive signal. Additionally, the control circuit 1700 receives an identification number (channel number) of the optical fiber 1100 in order to establish the interface between itself and an external device (not shown) of the optical monitor 1000.

An output end of the light receiving element 1500 is connected to a measurement circuit 1800, and an output signal from the measurement circuit 1800 is output to the outside of the apparatus as a result of measuring the light quantity in the optical monitor 1000.

With this structure, since the linear scale 1600 is used for detecting a position of the movement portion 1400 of the movement mechanism and executes feedback positioning control, correct positioning can be constantly performed even if the characteristic of the movement mechanism fluctuates due to a change in environment or elapse of time. As a result, the loss as the optical path switching apparatus can be also constantly maintained low. Additionally, by performing positioning by using the linear scale 1600, the movement mechanism does not have to have the structure for carrying out positioning of the V-shaped grooves in the prior art, and the mechanism itself can be also simplified.

Figure 17:
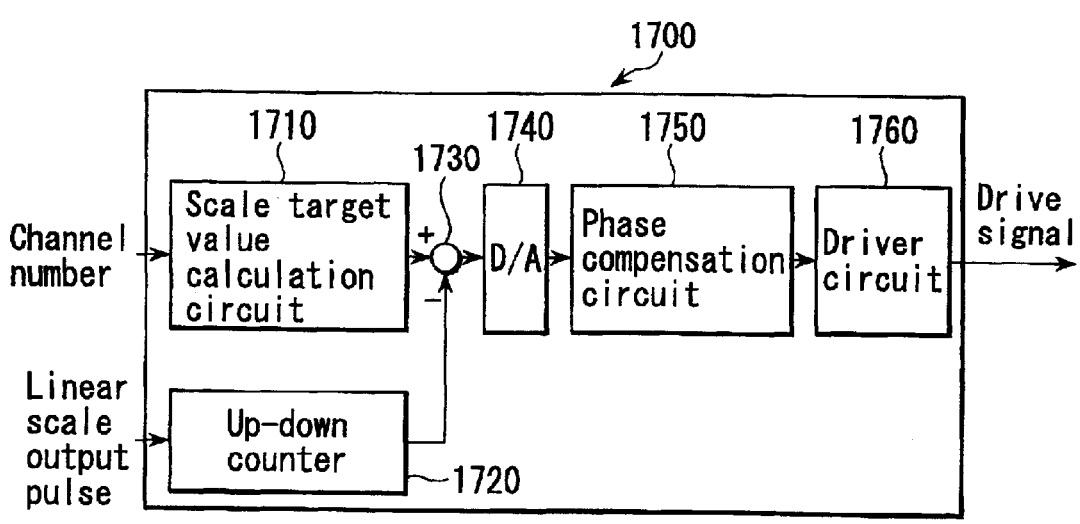
FIG. 17 shows a detailed block structure of a control circuit according to the ninth embodiment.

The control circuit 1700 of the optical monitor 1000 according to the ninth embodiment comprises electrical constituent elements such as shown in FIG. 17. That is, the control circuit 1700 comprises: a scale target value calculation circuit 1710, which operates as scale target value outputting means such as described above; an up-down counter 1720; a subtraction circuit 1730, which operates as position error calculating means such as described above; a digital-to-analog converter 1740; a phase compensation circuit 1750, which conducts "phase lead compensation" which will be described later; and a driver circuit 1760 used for amplifying an electric current.

The operation of the optical monitor 1000 of the above-described optical path switching apparatus will now be concretely described. The optical fibers 1100 are output ends of, e.g., the optical switch or the wavelength filter, and the independent light is emitted from each optical fiber 1100. In order to measure each light quantity, a number of the fiber to be measured is input as a channel number to the optical monitor 1000 from the outside. For example, in case of measuring the light quantity of the leftmost fiber, "1" is input as a channel number.

In response to the input channel number, the scale target value calculation circuit 1710 calculates a value of the corresponding linear scale 1600, namely, a linear scale value when the light receiving element 1500 is positioned directly below the fiber of "1" (output value of the up-down counter 1720), and outputs the calculated value as a target value to the subtraction circuit 1730. This target value is a digital value. For example, when the linear scale with which one pulse is generated with movement of 1 μm is used and a distance of the movement portion 1400 is approximately 50 mm (that is, when a range detected by the linear scale 1600 is approximately 50 mm), this value becomes not less than 16 bits.

On the other hand, a predetermined pulse is supplied from the linear scale 1600 in accordance with movement of the movement portion 1400, the pulse number is counted by the up-down counter 1720, and an output from the up-down counter 1720 is output to the subtraction circuit 1730 as a value indicative of a current position of the movement portion 1400.

The subtraction circuit 1730 calculates a difference between a scale target value (output from the scale target value calculation circuit 1710) and a current scale value (output from the up-down counter 1720, which has received an output from the linear scale 1600), namely, a current quantity of a position error. Such subtraction processing is carried out in digital values.

The quantity of the position error obtained by the subtraction circuit 1730 is converted into an analog signal by the digital-to-analog converter 1740 and input to the phase compensation circuit 1750. In the phase compensation circuit 1750, in order to stabilize the operation of the positioning control system (feedback control loop) consisting of the movement portion 1400, the linear scale 1600 and the control circuit 1700, the "phase lead compensation" is mainly carried out for the purpose of assuring the phase margin and the gain margin. This compensation is actually performed by an analog filter.

An output from the phase compensation circuit 1750 is subjected to electric current amplification by the driver circuit 1760, and supplied to the movement portion 1400 as a drive signal.

Since the drive signal in the direction of canceling out the position error is constantly supplied to the movement portion 1400, feedback control for matching a position of the movement portion 1400 with the scale target value is executed. Consequently, the movement portion 1400 is positioned to a position corresponding to the scale target value.

As a result of this positioning control, since the light receiving element 1500 is correctly positioned directly below the optical fiber as a measurement target, for example, the optical fiber having the number "1", a quantity of the light emitted from this optical fiber can be measured by measuring an output from the light receiving element at this moment by the measurement circuit 1800. After completion of this measurement, when a channel number of the optical fiber as a next measurement target is input from a non-illustrated external controller, the movement portion 1400 moves to a position of the optical fiber corresponding to this number and is again positioned, thereby enabling next measurement.

In this positioning control, the polarity and a quantity of an error between a position of the movement portion 1400 and a target value can be always conceived, thereby enabling stable and high-speed control for positioning.

Further, by providing the scale portion 1610, which is relatively light in weight in the linear scale 1600 to the side where the movement portion 1400 exists, the weight of the movement portion 1400 can be reduced, and high-speed control is thereby likewise enabled.

As described above, according to the ninth embodiment, the accurate and high-speed positioning of the movement portion 1400 is possible by performing detection of a position of the movement portion 1400 by the linear scale 1600 and feeding back a difference from a target value (position error) to the movement portion 1400. Therefore, the high-speed optical path switching operation with the excellent repeatability or the high-speed/high-stability optical monitor apparatus utilizing this operation can be realized.

Furthermore, the interface with the outside of this apparatus can be established by using an identification number of the optical fiber 1100, and fine control is no longer necessary as control over the movement portion 1400 from the outside, thereby facilitating handling of the apparatus.

Tenth Embodiment

A tenth embodiment according to the present invention will now be described with reference to FIGS. 18 to 20.

Figure 18:
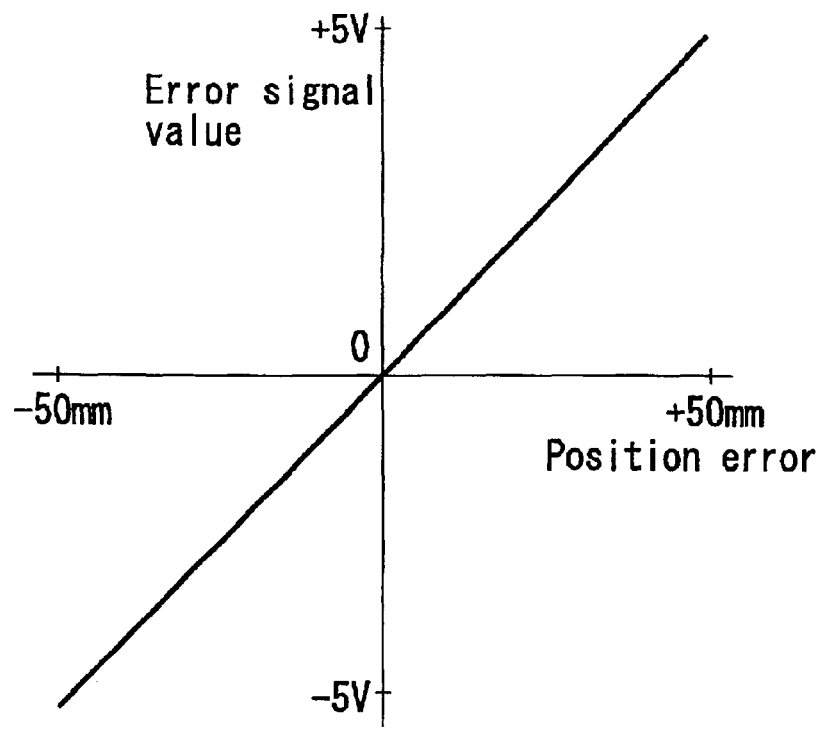
FIG. 18 is a graph showing the relationship between an error signal value and a position error as an accuracy characteristic for positioning according to a tenth embodiment.

FIG. 18 is a positioning accuracy characteristic graph showing the relationship between an error signal value and a position error in the tenth embodiment.

In the ninth embodiment mentioned above, a difference between a current position detected by the linear scale 1600 and a target value is obtained by subtraction and determined as an error signal as it stands. In this case, for example, assuming that a moving range of the movement portion is 50 mm and an error signal after digital-to-analog conversion is ±5 V, a characteristic such as the graph shown in FIG. 18 is required. When the very high accuracy, for example, the accuracy of several μm is necessary as the accuracy for positioning, an error signal voltage corresponding to this accuracy is not more than 1 mV, and the desired accuracy may not be obtained due to the influence of noise of the circuit or offset.

The tenth embodiment described herein solves the above-mentioned problem. That is, controlling means of the optical path switching apparatus further includes saturation processing means (which will be described in detail later), which determines an output from the above-described position error detecting means as a predetermined value when an absolute value of this output is not less than a predetermined value.

Figure 19:
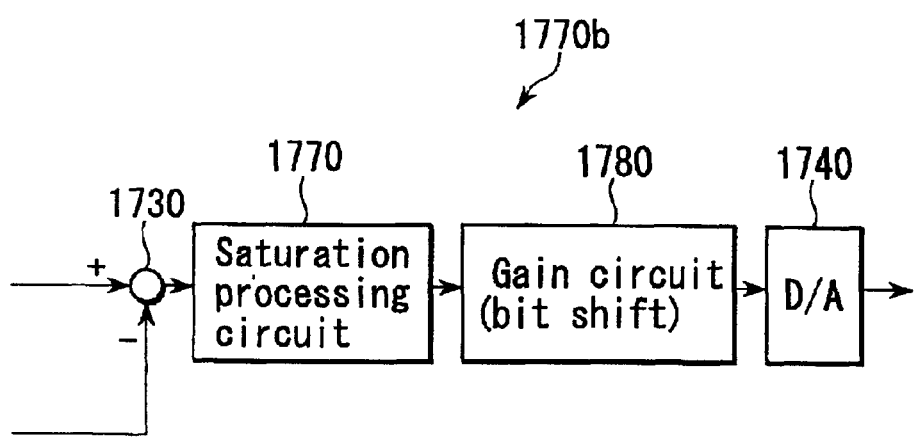
FIG. 19 shows a detailed block structure of a control circuit according to the tenth embodiment.
Figure 20:
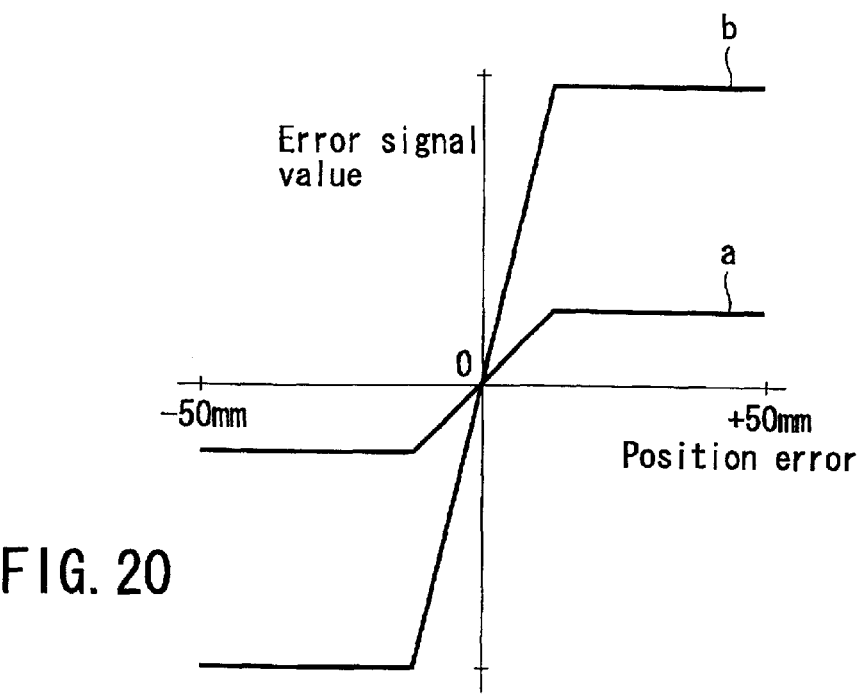
FIG. 20 is a graph showing the relationship between the error signal value and the position error as the accuracy characteristic for positioning according to the tenth embodiment.

Giving description on the characteristic of the tenth embodiment with reference to FIGS. 19 and 20, the apparatus according to the tenth embodiment comprises the optical path switching apparatus with the structure substantially equal to that of the ninth embodiment mentioned above. However, as a detailed difference, the structure of the control circuit is somewhat different from the ninth embodiment as shown in FIG. 19 block diagram.

That is, in the tenth embodiment, the control circuit 1770b is constituted as follows. In addition to the subtraction circuit 1730 mentioned above, a saturation processing circuit 1770, which operates as the saturation processing means and a gain circuit (bit shift circuit) 1780, which gives a predetermined gain are sequentially connected, and the above-described digital-to-analog converter 1740 is further connected.

An output from the subtraction circuit 1730 is input to the saturation processing circuit 1770, and further input to the gain circuit 1780. Thereafter, it is input to the digital-to-analog converter 1740.

Incidentally, the saturation processing circuit 1770 outputs an output from the subtraction circuit 1730 as it is when an absolute value of this output is not more than a predetermined value, and it outputs a fixed value with the same sign when the absolute value is not less than the predetermined value. Showing the relationship between the error signal value and the position error in the tenth embodiment in a graph of FIG. 20, this signal to be output is represented by a line a in FIG. 20.

Subsequently, the gain circuit 1780 applies a predetermined gain to the signal having this characteristic. Here, since the signal is a digital value, application of the gain can be substituted by performing bit shift in the direction of the most significant bit. For example, performing shift by two bits in the direction of the most significant bit is the same as applying the four-fold gain.

This output signal is indicated by a line b in FIG. 20. The signal indicated by the line b becomes the error signal, passes through the phase compensation circuit 1750 or the driver circuit 1760, and is fed back to the movement portion 1400.

In this manner, by operating the waveform of the position error signal (namely, the characteristic), the inclination of the error signal can be increased in the vicinity of a starting point of the error signal actually used for positioning, thereby heightening the error signal voltage with respect to the desired accuracy (that is, heightening the error signal sensitivity). Therefore, it is possible to avoid deterioration of the positioning accuracy due to noise of the circuit or offset.

Incidentally, when the error is larger than the predetermined value, a fixed error signal is output instead of a value corresponding to a true error. However, since only the error signal characteristic in the vicinity of the starting point actually exerts an influence on the accuracy for positioning, this point does not have the influence on the positioning accuracy. However, the polarity becomes a positive feedback if it is not the same as that of the original value, and positioning can not be performed in some cases.

As described above, according to the tenth embodiment, when a difference between the scale target value and a detection value is not more than a predetermined value, a value corresponding to this difference is output as it is. When the difference is not less than the predetermined value, a fixed value is output. Therefore, the sensitivity of the position error signal can be improved, and positioning of the movement portion 1400 can be carried out with the higher accuracy than that of the prior art apparatus without being affected by offset or drift of the circuit.

As a result, the optical path switching operation with the higher accuracy is possible, and correct positioning can be conducted even if the optical fibers 1100 are aligned with a relatively small pitch. Consequently, the high-density packaging of the optical fiber as a switching target can be performed, thereby realizing multi-channel as the optical path switching apparatus or the optical monitor apparatus or reduction in size of the apparatus.

Eleventh Embodiment

In case of the tenth embodiment mentioned above, the error signal is a fixed value when the position error is not less than a predetermined value. Therefore, when the initial position error is large or when the switching to a position apart from a current position is indicated and the position error thereby becomes large, the subsequent positioning operation may become oscillatory (repeating/reciprocating operation). That is, in an area where the error signal is fixed (namely, an area where saturation processing is carried out), the error signal is not reduced regardless of driving the movement portion 1400 in the direction for reducing the position error. Therefore, the movement portion 1400 is extremely accelerated, and deceleration is insufficient even if deceleration is performed after the error signal corresponding to the position error enters an area where the error signal is output. As a result, the positioning target value (namely, a starting point of the error signal) may be overreached in some cases (however, in such a case, only positioning becomes oscillatory, and the final positioning accuracy is not affected).

An eleventh embodiment improves this point, and prevents the movement portion from being accelerated more than necessary by performing speed control instead of position control in an area where the position error is large, thereby shortening the positioning time.

Consequentially, the above-described controlling means of the optical path switching apparatus further includes: speed detecting means for detecting a moving speed of the movement mechanism based on a linear scale output; speed target value outputting means for outputting a speed target value of movement of the movement mechanism; speed error calculating means for obtaining a difference between the speed target value and an output from the speed detecting means; and selecting means for selecting at least one of an output from the position error calculating means and an output from the speed error calculating means, that is, one or both of these outputs so as to be fed back as a drive signal of the movement mechanism (which will be described in detail later).

The eleventh embodiment will now be described with reference to FIGS. 21 and 22.

Figure 21:
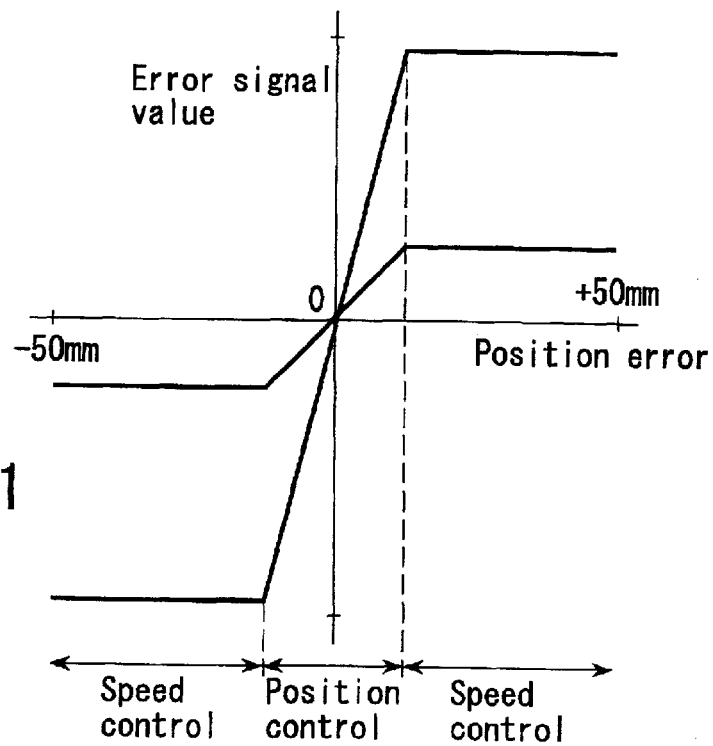
FIG. 21 is a graph showing a position error area in which speed control or position control is carried out in an optical path switching apparatus according to an eleventh embodiment of the present invention.
Figure 22:
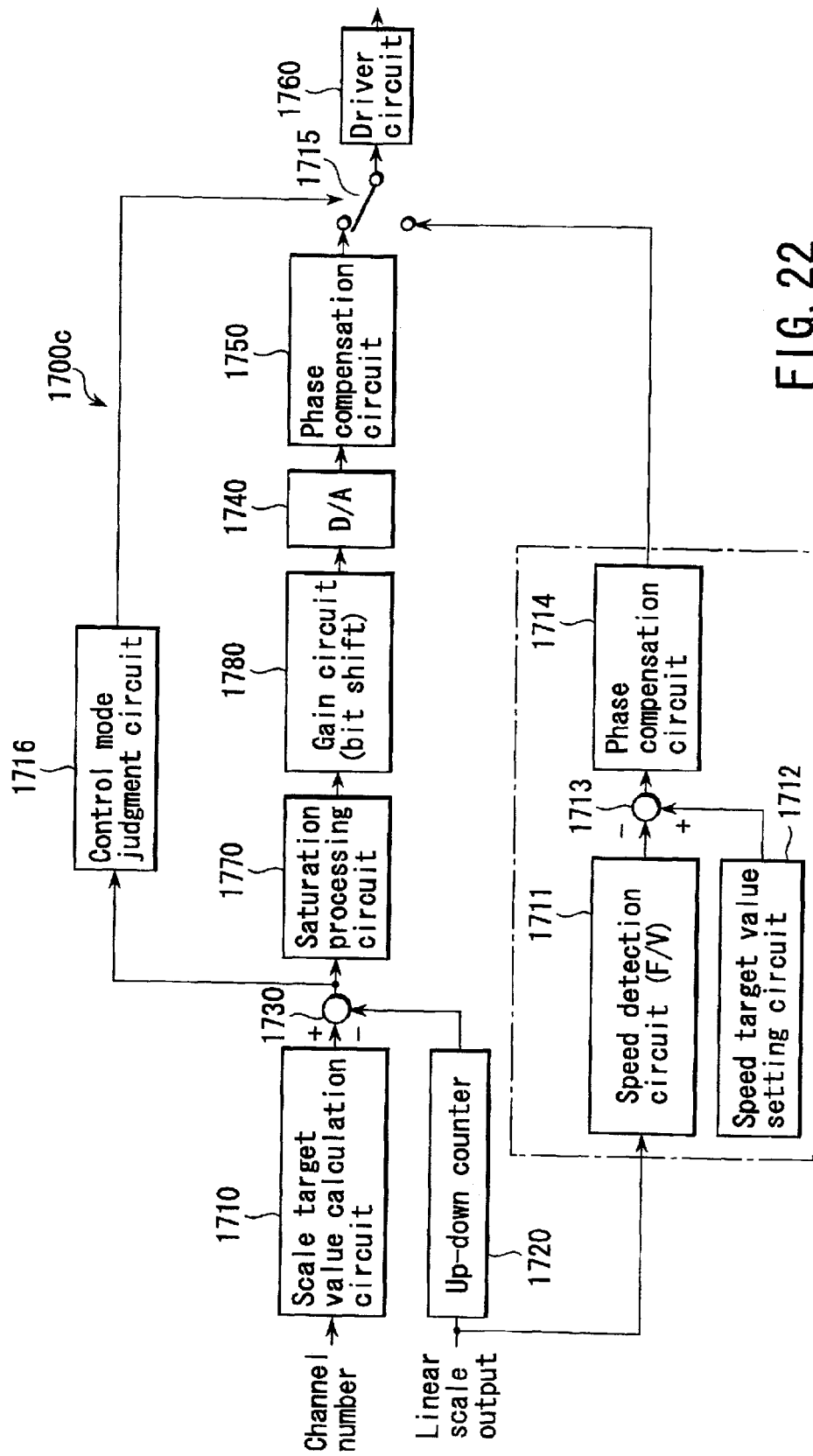
FIG. 22 shows a detailed block structure of a control circuit according to the eleventh embodiment.

FIG. 21 is a graph showing a position error area in which speed control or position control is carried out in the eleventh embodiment. FIG. 22 shows a detailed structure of a control circuit 1700c in the eleventh embodiment. As shown in FIG. 22, the control circuit 1700c is configured as follows. That is, in addition to the scale target value calculation circuit 1710, the up-down counter 1720 and the subtraction circuit 1730 mentioned above, a control mode judgment circuit 1716 and a saturation processing circuit 1770 are connected. To the saturation processing circuit 1770 are sequentially connected a gain circuit 1780, a digital-to-analog converter 1740 and a phase compensation circuit 1750.

An output from the phase compensation circuit 1750 and an output from the control mode judgment circuit 1716 can be selectively switched by a switch 1715, and the switch 1715 is connected to the above-described driver circuit 1760.

Further, an output end of the linear scale is connected to a part constituted by a speed detection circuit 1711, a speed target value setting circuit 1712, a subtraction circuit 1713, and a phase compensation circuit 1714.

The speed detection circuit 1711 detects a moving speed of the movement portion 1400 by subjecting an output pulse of the linear scale 1600 to frequency-voltage conversion. The speed target value setting circuit 1712 outputs a speed target value when moving. The subtraction circuit 1713 calculates a speed error by calculating a difference between the speed target value and a speed detection value. The phase compensation circuit 1714 stabilizes a speed control loop.

Furthermore, the switch 1715 selectively changes over a signal from the phase compensation circuit 1750 of the positioning system and a signal from the phase compensation circuit 1714 of the speed control system. The control mode judgment circuit 1716 judges a control mode based on the magnitude of a position error.

In the eleventh embodiment, as shown in FIG. 21, the speed control is carried out in an area where the position error is large, and the position control is effected in an area where the position error is small. That is, in an area where the position error is large, the switch 1715 selects an output from the phase compensation circuit 1714 of the speed control system as an input to the driver circuit 1760. On the contrary, in an area where the position error is small, the switch 1715 selects an output from the phase compensation circuit 1750 of the position control system as an input to the driver circuit 1760.

With such a circuit configuration and control, in the area where the position error is large, the moving speed of the movement portion 1400 is controlled to a speed set by the speed target value setting circuit 1712, the position error becomes small, and the speed when switching to the position control can be managed. Thus, the overshoot (transient overshoot) at the time of positioning control becomes small, thereby shortening the positioning time.

As described above, according to the eleventh embodiment, since the optical monitor 1000 is configured to perform the speed control by which a speed of the movement portion 1400 is detected and an error between the detected speed and a target speed is obtained to be fed back to the movement portion 1400, the movement portion 1400 is not excessively accelerated, thereby reducing the positioning time.

As a result, the switching time during the optical path switching operation or the optical monitor operation can be greatly reduced.

Modification

Although the position control and the speed control are selectively executed in the eleventh embodiment, even if the modification is applied so that these controls are simultaneously conducted by, e.g., a method of adding a drive signal and the speed control applies damping to the position control, the speed of the movement portion 1400 can be managed to some degree.

Moreover, since the phase delay of the speed control system is smaller than that of the position control system, the phase compensation circuit 1714 of the speed control system may be omitted in some cases.

Twelfth Embodiment

According to the ninth to eleventh embodiments, the high-speed optical path switching apparatus with the high stability and the high accuracy can be realized. However, in case of using this apparatus as the optical monitor, when fiber lines on the input side are aligned at a narrow pitch in accordance with the accuracy for switching the optical path, the light emitted from an adjacent optical fiber may enter the light receiving element, and the correct light quantity measurement may not be carried out.

In order to improve such a disadvantageous point, the optical path switching apparatus according to the twelfth embodiment further has a light shielding member, which is arranged between the first optical element and the second optical element and defines an opening restricting the light that falls on the second optical element.

In addition, this light shielding member has an opening defining portion, which defines the opening, and a fixing portion, which integrally fixes the light shielding member to the second optical element, and the opening defining portion has a convex shape with respect to the fixing portion (which will be described in detail later).

FIGS. 23A and 23B partially show the detail of the periphery of the light receiving element in the twelfth embodiment. For example, many optical fibers including multiple optical fibers 1100a are held and aligned by a fiber holding portion 1200a at a narrow pitch of, e.g., 0.25 to 0.5 mm, as shown in FIG. 23A. One divergent light 1110 emitted from one switched optical fiber 1100a is positioned so as to enter the opposed light receiving element 1500a. This light receiving element 1500a is mainly constituted by a package 1510, a light receiving area 1520 and a lead wire 1530 and has a pin hole 1540 as the opening defining portion at the center of a top portion thereof, and the fixing portion 1550 for fixing the pin hole 1540 on the package 1510 is formed on the top face portion thereof.

Generally, the light emitted from the optical fiber becomes the divergent light of NA=approximately 0.1 to 0.2. Therefore, when the optical fibers are aligned at a narrow pitch, hems of the respective divergent lights overlap. Although it is desirable to minimize the light receiving area of the light receiving element and approximate it to the optical fiber in order to avoid this influence, most of the light receiving elements have the light receiving area accommodated in the package, and it is often the case that the light receiving element can not be approximated the emission end of the optical fiber.

Therefore, as exemplified in the twelfth embodiment, it is desirable to provide an opening restriction member such as the pin hole 1540 or a slit between the light receiving element 1500a and the optical fiber 1000a in order to prevent the light from any adjacent optical fiber.

Meanwhile, it is often the case that the end face of the optical fiber 1100a is "diagonally cut" when seen from the side, as shown in FIG. 23B. Such cutting is provided in order to prevent the reflected light generated due to a difference in refraction factor between a core portion of the optical fiber 1100a and air from returning to the inside of the optical fiber 1100a. This "diagonal cut" is generally applied to not only the fiber element but also to the holding member of the fiber because of a problem of workability. Additionally, the light emitted from the end face of the diagonally cut optical fiber is emitted so as to be inclined to the direction opposed to that when the fiber is diagonally cut.

Therefore, in case of providing the opening restriction member, the opening restriction member and an acute portion of the diagonally cut holding member end face interfere with each other, and the distance between them can not be reduced. Accordingly, cross talk occurs between adjacent optical fibers in the optical path switching operation. Alternatively, in order to avoid cross talk, the alignment pitch of the fibers must be increased, which leads to a problem of increase in size of the apparatus.

Thus, in the twelfth embodiment, the small pin hole 1540 is provided in the convex form with respect to the fixing portion 1550 as shown in FIG. 23B. Therefore, the pin hole 1540 can be moved toward the optical fiber 1100a whilst the fixing portion 1550 can be assuredly fixed to the package 1510 of the light receiving element 1500a while avoiding the diagonally cut fiber holding portion 1200a. That is, there can be achieved reduction in size of the pin hole portion and in distance to the fiber end face and improvement in attachment to the light receiving element package. Further, since the pin hole 1540 can be moved closer to the end face of the optical fiber 1000a, the divergent light emitted from an adjacent optical fiber can be assuredly prevented.

As described above, according to the twelfth embodiment, the opening restriction member is provided between the light receiving element and the optical fiber, the fixing portion is enlarged with respect to the pin hole constituting the opening restriction portion, and the pin hole is set in the convex form onto the fixing portion and mounted to the light receiving element. As a result, the opening restriction can be carried out at a position close to the optical fiber, and cross talk from any adjacent optical fiber in the optical path switching operation or the optical monitor operation can be thereby greatly reduced.

Thirteenth Embodiment

In the ninth to twelfth embodiments mentioned above, description has been given as to the case where the invention is applied to the optical monitor including the optical switching apparatus such that the first optical element is the optical fiber and the second optical element is the light receiving element. The present invention can be, however, applied to the optical switching apparatus itself. A thirteenth embodiment exemplifies the case where the optical path switching apparatus according to the present invention is applied to the optical switch and the switching target of the optical switch is the first optical element and the second optical element both of which are optical fibers.

FIG. 24 shows an optical switch 2000 to which the optical path switching apparatus is applied as the thirteenth embodiment according to the present invention. Although the optical switch is substantially equal to the optical monitor 1000 shown in FIG. 16 in structure, the optical switch 2000 has a coupling lens 2100 and optical fibers 2200 as the second optical element in FIG. 24 in place of the FIG. 16 light receiving element 1500.

Furthermore, since the movement portion 1400 can be rapidly and correctly positioned to each optical fiber 1100 as similar to the ninth to twelfth embodiments mentioned above, the light emitted from any optical fiber 1100 can be coupled to the optical fiber 2200 or, contrary, the light emitted from the optical fiber 2200 can be coupled to the optical fiber 1100, thereby realizing the N:1 optical switching apparatus.

In this manner, according to the thirteenth embodiment, as similar to the ninth to twelfth embodiments described above, it is possible to realize the optical switching apparatus which enables high-speed switching and has the high stability.

Other Modifications

Although the above has described the optical path switching apparatus according to the present invention based on the multiple embodiments, the present invention is not restricted by the foregoing embodiments, and various modifications are possible. For example, in each of the above embodiments, a position error signal is obtained in the form of a digital value, and it is input to the analog phase compensation circuit after converting this signal into an analog signal by the digital-to-analog converter. However, a digital filter can be used as the phase compensation circuit, and the digital value can be subjected to phase compensation without being converted into an analog signal.

Moreover, besides the digital filter of the phase compensation circuit, peripheral function parts such as target value setting or speed control can be also implemented in a digital signal processor (DSP), and main predetermined parts of the present invention can be embodied by software.

Although concrete description has been given as to the several embodiments with reference to the drawings, the present invention is not restricted to these foregoing embodiments, and it includes all embodiments that can be carried out without departing from its scope.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An optical path switching apparatus, which includes an optical element array having a plurality of first optical elements, for optically coupling one of the first optical elements with a second optical element, the optical path switching apparatus comprising:

a guide extending substantially parallel to an alignment of the first optical elements;

a movement mechanism for moving the second optical element, the movement mechanism including a movement portion capable of moving along the guide, the movement portion supporting the second optical element;

position detecting means for detecting a position of the second optical element; and a controlling means for controlling the position of the movement portion based on information obtained by the position detecting means;

wherein the position detecting means comprises a linear scale, and the controlling means includes scale target value outputting means for outputting a scale target value as a positioning target value of the movement mechanism, and position error calculating means for obtaining an error between the scale target value and an output from the linear scale, the output from the position error calculating means being fed back as a drive signal for the movement mechanism.

2. The optical path switching apparatus according to claim 1, wherein the controlling means further includes saturation processing means for determining an output from the position error detecting means as a predetermined value when an absolute value of the output is not less than the predetermined value.

3. The optical path switching apparatus according to claim 1, wherein the controlling means further includes: speed detecting means for detecting a moving speed of the movement mechanism based on a linear scale output; speed target value outputting means for outputting a speed target value for movement of the movement mechanism; speed error calculating means for obtaining a difference between the speed target value and a speed detecting means output; and selecting means for selecting at least one of an output from the position error calculating means and an output from the speed error calculating means, the selected one being fed back as a drive signal for the movement mechanism.

4. The optical path switching apparatus according to claim 3, wherein the selecting means executes the selection based on a difference of the scale target value and the linear scale output.

5. The optical path switching apparatus according to claim 1, wherein the first optical element comprises an optical fiber, and the second optical element comprises a light receiving element.

6. The optical path switching apparatus according to claim 1, wherein both the first optical element and the second optical element comprise optical fibers.

7. The optical path switching apparatus according to claim 1, wherein the linear scale comprises a scale portion having a predetermined fine pattern provided thereto, and an optical portion that irradiates the scale portion with light for detection and receives reflected light, the scale portion being fixed to the movement portion of the movement mechanism, the movement mechanism having provided a fixed portion, and the optical portion being fixed to the fixed portion.

8. The optical path switching apparatus according to claim 1, wherein the scale target value outputting means outputs a scale target value based on an identification number of the first optical element as a switching target in an optical element array to which the scale target value is input 9. The optical path switching apparatus according to claim 1, further comprising a light shielding member defining an opening restricting incident light to the second optical element, light shielding member which is arranged between the first optical element and the second optical element.

10. The optical path switching apparatus according to claim 9, wherein the light shielding member has an opening defining portion defining an opening, and a fixing portion integrally fixing the light shielding member to the second optical element, the opening defining portion having a convex shape with respect to the fixing portion.

11. The optical path switching apparatus according to claim 1, further comprising a light shielding member defining an opening restricting incident light to the second optical element, light shielding member which is arranged between the first optical element and the second optical element.

12. The optical path switching apparatus according to claim 11, wherein the light shielding member has an opening defining portion defining an opening, and a fixing portion integrally fixing the light shielding member to the second optical element, the opening defining portion having a convex shape with respect to the fixing portion.

13. An optical path switching apparatus, which includes an optical element array having a plurality of first optical elements, for optically coupling one of the first optical elements with a second optical element, the optical path switching apparatus comprising:

a guide extending substantially parallel to an alignment of the first optical elements;

a movement mechanism for moving the second optical element, the movement mechanism including a movement portion capable of moving along the guide, the movement portion supporting the second optical element; and position detecting means for detecting a position of the second optical element;

wherein the first optical element comprises an optical fiber, and the second optical element comprises a light receiving element for detecting a quantity of received light and wherein the position detecting means detects a position of the second optical element based on an output from the light receiving element.

14. The optical path switching apparatus according to claim 13, wherein the position detecting means includes a circuit for detecting a peak position of an output from the light receiving element.

15. The optical path switching apparatus according to claim 14, wherein the position detecting means further includes an external scale, the external scale being utilized for rough positioning while the light receiving element being utilized for precise positioning.

16. The optical path switching apparatus according to claim 13, wherein the light receiving element has two light receiving areas, which are adjacent to each other along the alignment of the first optical elements, and the position detecting means has a differential amplifier for obtaining a difference in output between the two light receiving areas of the light receiving element.

17. An optical path switching apparatus, which includes an optical element array having a plurality of first optical elements, for optically coupling one of the first optical elements with a second optical element, the optical path switching apparatus comprising:

a deflecting mirror for deflecting an optical path between the first optical element and the second optical element;

a guide extending substantially parallel to an alignment of the first optical elements;

a movement mechanism for moving the deflecting mirror, the movement mechanism including a movement portion capable of moving along the guide, the movement portion supporting the deflecting mirror;

position detecting means for detecting a position of the deflecting mirror; and a controlling means for controlling a position of the movement portion based on information obtained by the position detecting means;

wherein the position detecting means comprises a linear scale, and the controlling means includes scale target value outputting means for outputting a scale target value as a positioning target value of the movement portion, and position error calculating means for obtaining an error between the scale target value and an output from the linear scale, the output from the position error calculating means being fed back as a drive signal for the movement mechanism.

18. The optical path switching apparatus according to claim 17, wherein the controlling means further includes: speed detecting means for detecting a moving speed of the movement mechanism based on a linear scale output; speed target value outputting means for outputting a speed target value for movement of the movement mechanism; speed error calculating means for obtaining a difference between the speed target value and a speed detecting means output; and selecting means for selecting at least one of an output from the position error calculating means and an output from the speed error calculating means, the selected one being fed back as a drive signal for the movement mechanism.

19. The optical path switching apparatus according to claim 18, wherein the selecting means executes the selection based on a difference of the scale target value and the linear scale output.

20. The optical path switching apparatus according to claim 17, wherein the first optical element comprises an optical fiber, and the second optical element comprises a light receiving element for detecting a quantity of received light.

21. The optical path switching apparatus according to claim 17, further comprising a convex lens located between the first optical element and the deflecting mirror.

22. The optical path switching apparatus according to claim 17, wherein the first optical element comprises an optical fiber, and the second optical element comprises an optical fiber optically coupled with any other optical element.

23. The optical path switching apparatus according to claim 17, wherein the controlling means further includes saturation processing means for determining an output from the position error detecting means as a predetermined value when an absolute value of the output is not less than the predetermined value.

* * * * *